(12) United States Patent
Pillarella et al.

(10) Patent No.: US 12,246,288 B2
(45) Date of Patent: Mar. 11, 2025

(54) ARTICLES COMPRISING ADHESIVE MEMBRANES WITH IMPROVED GEOMETRY AND WATER ENTRY PRESSURE

(71) Applicant: W. L. Gore & Associates, Inc., Newark, DE (US)

(72) Inventors: Corinne Pillarella, Newark, DE (US); Robert Gifford, Newark, DE (US); Kelly Wieczorek, Newark, DE (US)

(73) Assignee: W. L. Gore & Associates, Inc., Newark, DE (US)

( * ) Notice: Subject to any disclaimer, the term of this patent is extended or adjusted under 35 U.S.C. 154(b) by 958 days.

(21) Appl. No.: 17/334,644

(22) Filed: May 28, 2021

(65) Prior Publication Data

US 2021/0379535 A1     Dec. 9, 2021

Related U.S. Application Data

(60) Provisional application No. 63/035,240, filed on Jun. 5, 2020.

(51) Int. Cl.
    *B01D 63/08*     (2006.01)
    *B01D 67/00*     (2006.01)
    (Continued)

(52) U.S. Cl.
    CPC ......... *B01D 63/0822* (2022.08); *B01D 69/02* (2013.01); *B01D 71/36* (2013.01);
    (Continued)

(58) Field of Classification Search
    CPC .... B01D 63/0822; B01D 69/02; B01D 71/36; B01D 67/0088; B01D 2313/025;
    (Continued)

(56) References Cited

U.S. PATENT DOCUMENTS

| | | |
|---|---|---|
| 2,738,492 A | 3/1956 | Arneson |
| 3,953,566 A | 4/1976 | Gore |

(Continued)

FOREIGN PATENT DOCUMENTS

| | | |
|---|---|---|
| CN | 1220755 A | 6/1999 |
| CN | 1729025 A | 2/2006 |

(Continued)

OTHER PUBLICATIONS

PTFE Membrane Filters, Sterlitech Corporation. (Year: 2018).*

(Continued)

*Primary Examiner* — Patricia L. Nordmeyer
(74) *Attorney, Agent, or Firm* — Faegre Drinker Biddle & Reath LLP

(57) ABSTRACT

Some embodiments of the present disclosure relate to an article comprising a membrane. In some embodiments, the membrane comprises a first surface. In some embodiments, the first surface of the membrane comprises an inner region and an outer region. In some embodiments, the adhesive layer is disposed on the outer region. In some embodiments, the article exhibits a water entry pressure that is 25% to 50% higher than a comparative article when tested according to the Assembly Water Entry Pressure Test ("Assembly WEP Test"). In some embodiments, the comparative article is identical to the article except that the inner region of the first surface of the membrane of the article has a perimeter that is 10% to 75% higher than a perimeter of an inner region of a first surface of a membrane of the comparative article.

20 Claims, 24 Drawing Sheets

(51) Int. Cl.
    *B01D 69/02*     (2006.01)
    *B01D 71/36*     (2006.01)
    *F21S 45/33*     (2018.01)

(52) U.S. Cl.
    CPC .... *B01D 67/0088* (2013.01); *B01D 2313/025* (2013.01); *F21S 45/33* (2018.01)

(58) Field of Classification Search
    CPC .......... F21S 45/33; C09J 2483/00; C09J 7/26; C09J 7/38; C09J 7/20; C09J 7/245; C09J 2427/006; C09J 2433/00; C09J 183/04; C09J 133/04; C09D 127/18
    See application file for complete search history.

(56) References Cited

U.S. PATENT DOCUMENTS

| | | |
|---|---|---|
| 5,376,441 A | 12/1994 | Wu et al. |
| 5,417,743 A | 5/1995 | Daube |
| 5,828,012 A | 10/1998 | Repolle et al. |
| 6,210,014 B1 | 4/2001 | Kubizne et al. |
| 7,306,729 B2 * | 12/2007 | Bacino ............... B01D 67/0027 210/500.36 |
| 2002/0159273 A1 | 10/2002 | Erion |
| 2004/0133143 A1 | 7/2004 | Burton et al. |
| 2005/0207114 A1 | 9/2005 | Gall et al. |
| 2006/0150817 A1 | 7/2006 | Deguiseppi et al. |
| 2009/0029641 A1 | 1/2009 | Furuuchi |
| 2009/0081424 A1 | 3/2009 | Gomi |
| 2010/0270102 A1 | 10/2010 | Banter et al. |
| 2013/0156985 A1 | 6/2013 | Karube et al. |
| 2013/0260100 A1 | 10/2013 | Kelsey et al. |
| 2014/0205815 A1 | 7/2014 | Hodgins et al. |
| 2016/0236440 A1 | 8/2016 | Bacino |
| 2017/0245036 A1 | 8/2017 | Kuki et al. |
| 2020/0124230 A1 | 4/2020 | Hoffman et al. |

FOREIGN PATENT DOCUMENTS

| | | |
|---|---|---|
| CN | 201487901 U | 5/2010 |
| CN | 101975386 A | 2/2011 |
| CN | 201764464 U | 3/2011 |
| CN | 201844383 U | 5/2011 |
| CN | 102765237 A | 11/2012 |
| CN | 106520006 A | 3/2017 |
| CN | 106753003 A | 5/2017 |
| CN | 106764987 A | 5/2017 |
| CN | 110160004 A | 8/2019 |
| CN | 110230802 A | 9/2019 |
| CN | 209511880 U | 10/2019 |
| CN | 110785569 A | 2/2020 |
| DE | 4234919 A1 | 4/1994 |
| DE | 202017005625 U1 | 1/2018 |
| EP | 0317896 A1 | 5/1989 |
| EP | 0902943 B1 | 8/2002 |
| EP | 0954716 B1 | 7/2003 |
| EP | 1718127 A1 | 11/2006 |
| EP | 3556801 A1 | 10/2019 |
| JP | 02-121201 A | 5/1990 |
| JP | 05-002303 A | 1/1993 |
| JP | 08-164788 A | 6/1996 |
| JP | 10-340603 A | 12/1998 |
| JP | 11-025707 A | 1/1999 |
| JP | 2971743 B2 | 11/1999 |
| JP | 2003-151342 A | 5/2003 |
| JP | 2006-324260 A | 11/2006 |
| JP | 3916943 B2 | 5/2007 |
| JP | 2007-149470 A | 6/2007 |
| JP | 2011-142051 A | 7/2011 |
| JP | 2014-072257 A | 4/2014 |
| JP | 2017-073380 A | 4/2017 |
| JP | 2018-505801 A | 3/2018 |
| JP | 2018-156762 A | 10/2018 |
| KR | 20-0218158 Y1 | 3/2001 |
| KR | 10-2013-0042741 A | 4/2013 |
| KR | 10-2041913 B1 | 11/2019 |
| WO | 98/31966 A1 | 7/1998 |
| WO | 2000/047932 A1 | 8/2000 |
| WO | 2002/077522 A2 | 10/2002 |
| WO | 2016/130906 A1 | 8/2016 |
| WO | 2019/050127 A1 | 3/2019 |
| WO | 2019/089021 A1 | 5/2019 |
| WO | 2020/075855 A1 | 4/2020 |

OTHER PUBLICATIONS

Press-Fit Enclosure Protection Vents, Donaldson Filtration Solutions. (Year: 2019).*
Porex Automotive: "Achieve Rapid Pressure Equalization" XP002804551, Retrieved from the Internet: URL:https://learn.porex.com/lighting-elect ronics/automotive-ingress-p. 2018, 2 pages.
Search Report received for European Patent Application No. 21175543.4, mailed on Dec. 15, 2021, 6 pages.

* cited by examiner

ARTICLES COMPRISING ADHESIVE MEMBRANES WITH IMPROVED GEOMETRY AND WATER ENTRY PRESSURE

CROSS-REFERENCE TO RELATED APPLICATIONS

This application claims the benefit of U.S. Provisional Application No. 63/035,240, entitled "ARTICLES COMPRISING ADHESIVE MEMBRANES WITH IMPROVED GEOMETRY AND WATER ENTRY PRESSURE," filed on Jun. 5, 2020, the entirety of which is hereby incorporated by reference.

FIELD

The present disclosure relates to an article with improved geometry and water entry pressure.

BACKGROUND

Articles that include adhesive membranes are used for several applications, such as but not limited to, automotive headlamp vents and portable electronic vents. While there is demand for articles with improved water resistance, there is a concern that the improved water resistance may require increased material and manufacturing costs. Articles that provide improved water resistance while utilizing a cost-effective design are therefore needed.

SUMMARY

Some embodiments of the present disclosure relate to an article comprising a membrane. In some embodiments, the membrane comprises a first surface. In some embodiments, the first surface of the membrane comprises an inner region and an outer region. In some embodiments, the adhesive layer is disposed on the outer region. In some embodiments, the article exhibits a water entry pressure that is 25% to 50% higher than a comparative article when tested according to the Assembly Water Entry Pressure Test ("Assembly WEP Test"). In some embodiments, the comparative article is identical to the article except that the inner region of the first surface of the membrane of the article has a perimeter that is 10% to 75% higher than a perimeter of an inner region of a first surface of a membrane of the comparative article.

Covered embodiments are defined by the claims, not the above summary. The above summary is a high-level overview of various aspects and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

DRAWINGS

Figure 1A:
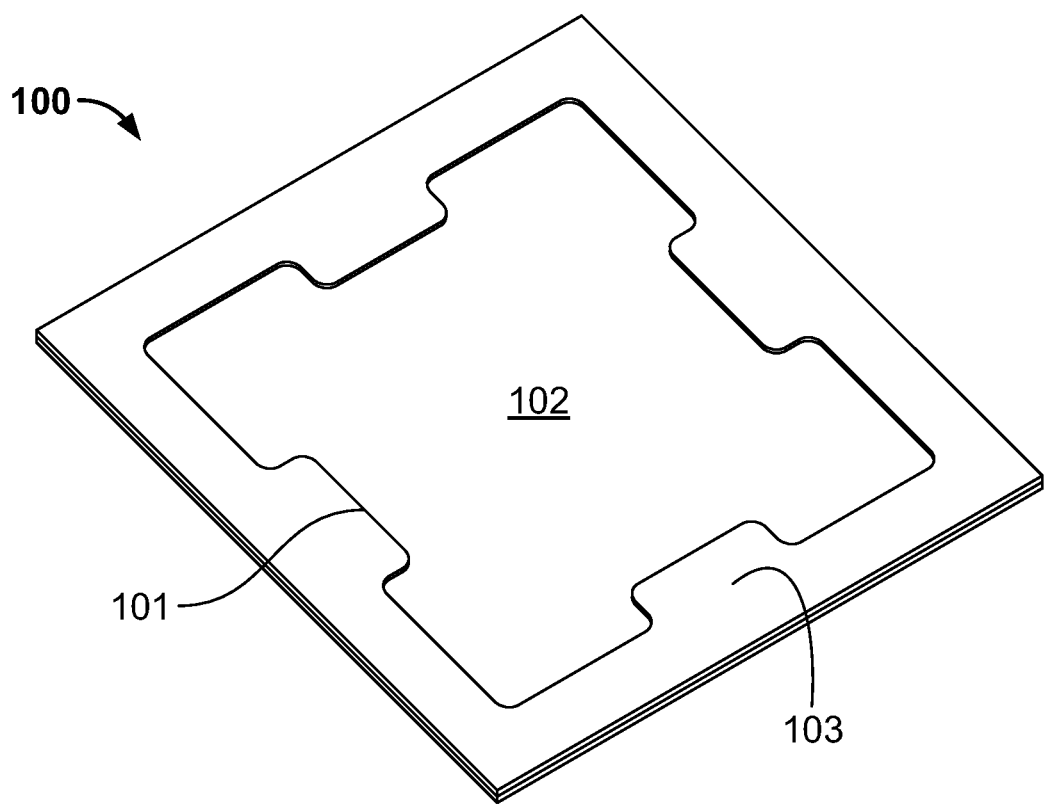
FIG. 1A is a perspective view of a first surface of an exemplary article having a four-tab-jigsaw shape.

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

DETAILED DESCRIPTION

As used herein, the term, "perimeter" refers to the total length of an enclosed shape. The term "perimeter" intended to encompass straight shapes, curved shapes, or any combination thereof. When the shape is curved, "perimeter" is intended to encompass circumference or arc length. When the shape is partially curved, such as in the case of a polygon with curved sides, the "perimeter" may be calculated, for example, by calculating an arc length of each curved side and then summing each arc length.

As used herein, the term "vent" refers to any device that is configured to equalize pressure between an enclosure and an external environment.

As used herein, the term "bonded" refers to any mechanism by which materials are attached together. Examples of suitable bonding mechanisms include, but are not limited to, heat bonding, laser bonding, mechanical attachment, at least one adhesive, or any combination thereof.

In some embodiments, bonding may occur through a combination of mechanical attachment and at least one adhesive, such as in the non-limiting case of a pressure sensitive adhesive. In some embodiments, bonding may occur through a combination of heat and at least one adhesive, such as in the non-limiting case of "hot glue."

As used herein, the phrase "the comparative article is identical to the article except that . . . " means that the comparative article has the exact same characteristics as the article with only the exception of any characteristics explicitly recited in a claim after the words "except that." In some embodiments, the characteristics of the article that may be the same as that of the comparative article may include but is not limited to, the same area, the same membrane type, the same adhesive layer type, and the same oleophobic treatment.

Some embodiments of the present disclosure relate to an article comprising a membrane. In some embodiments, the membrane comprises a first surface. In some embodiments, the first surface comprises an inner region and an outer region. In some embodiments, the adhesive layer is disposed on the outer region. In some embodiments, the article exhibits a water entry pressure that is 25% to 50% higher than a comparative article when tested according to the Assembly Water Entry Pressure Test ("Assembly WEP Test"). In some embodiments, the comparative article is identical to the article except that the inner region of the first surface of the membrane of the article has a perimeter that is 10% to 75% higher than a perimeter of an inner region of the first surface of the membrane of the comparative article.

In some embodiments, the article may take the form of a vent. While the specific type of vent is not limited, in some embodiments the vent may be an automotive vent. In some embodiments, the vent may be a portable electronic vent. In some embodiments the vent may comprise the article and a vent housing. In some embodiments, the article is bonded to the vent housing by the adhesive layer that is present on the outer region of the first surface of the membrane.

In some embodiments, the membrane of the article is a polymer membrane.

In some embodiments, the polymer membrane comprises polyamide, polyester, or a polyolefin (such as but not limited to polyethylene or polypropylene) or any combination thereof.

In some embodiments, the polymer membrane comprises polyvinylidene fluoride ("PVDF"), tetrafluoroethylene-hexafluoropropylene copolymer ("FEP"), tetrafluoroethylene-(perfluoroalkyl) vinyl ether copolymer ("PFA"), polytetrafluoroethylene ("PTFE"), or any combination thereof.

In some embodiments, the polymer membrane is an expanded polytetrafluoroethylene ("ePTFE") membrane. Some suitable non-limiting examples of ePTFE membranes are described in U.S. Pat. No. 3,953,566, which is incorporated by reference herein in its entirety.

In some embodiments, the membrane comprises an oleophobic coating. Non-limiting examples of suitable oleophobic coatings are described in U.S. Pat. No. 5,376,441, which is incorporated by reference herein in its entirety.

In some embodiments, the inner region of the first surface of the membrane of the article has an area of 7 $mm^2$ to 1500 $mm^2$. In some embodiments, the inner region of the first surface of the membrane of the article has an area of 50 $mm^2$ to 1500 $mm^2$. In some embodiments, the inner region of the first surface of the membrane of the article has an area of 100 $mm^2$ to 1500 $mm^2$. In some embodiments, the inner region of the first surface of the membrane of the article has an area of 500 $mm^2$ to 1500 $mm^2$. In some embodiments, the inner region of the first surface of the membrane of the article has an area of 750 $mm^2$ to 1500 $mm^2$. In some embodiments, the inner region of the first surface of the membrane of the article has an area of 1000 $mm^2$ to 1500 $mm^2$. In some embodiments, the inner region of the first surface of the membrane of the article has an area of 1250 $mm^2$ to 1500 $mm^2$.

In some embodiments, the inner region of the first surface of the membrane of the article has an area of 7 $mm^2$ to 1250 $mm^2$. In some embodiments, the inner region of the first surface of the membrane of the article has an area of 7 $mm^2$ to 1000 $mm^2$. In some embodiments, the inner region of the first surface of the membrane of the article has an area of 7 $mm^2$ to 750 $mm^2$. In some embodiments, the inner region of the first surface of the membrane of the article has an area of 7 $mm^2$ to 500 $mm^2$. In some embodiments, the inner region of the first surface of the membrane of the article has an area of 7 $mm^2$ to 250 $mm^2$. In some embodiments, the inner region of the first surface of the membrane of the article has an area of 7 $mm^2$ to 100 $mm^2$. In some embodiments, the inner region of the first surface of the membrane of the article has an area of 7 $mm^2$ to 50 $mm^2$.

In some embodiments, the inner region of the first surface of the membrane of the article has an area of 50 $mm^2$ to 1250 $mm^2$. In some embodiments, the inner region of the first surface of the membrane of the article has an area of 100 $mm^2$ to 1000 $mm^2$. In some embodiments, the inner region of the first surface of the membrane of the article has an area of 500 $mm^2$ to 750 $mm^2$.

In some embodiments, the inner region of the first surface of the membrane of the article has a perimeter of 10 mm to 300 mm. In some embodiments, the inner region of the first surface of the membrane of the article has a perimeter of 25 mm to 300 mm. In some embodiments, the inner region of the first surface of the membrane of the article has a perimeter of 50 mm to 300 mm. In some embodiments, the inner region of the first surface of the membrane of the article has a perimeter of 100 mm to 300 mm. In some embodiments, the inner region of the first surface of the membrane of the article has a perimeter of 150 mm to 300 mm. In some embodiments, the inner region of the first surface of the membrane of the article has a perimeter of 200 mm to 300 mm. In some embodiments, the inner region of the first surface of the membrane of the article has a perimeter of 250 mm to 300 mm.

In some embodiments, the inner region of the first surface of the membrane of the article has a perimeter of 10 mm to 250 mm. In some embodiments, the inner region of the first surface of the membrane of the article has a perimeter of 10 mm to 200 mm. In some embodiments, the inner region of the first surface of the membrane of the article has a perimeter of 10 mm to 150 mm. In some embodiments, the inner region of the first surface of the membrane of the article has a perimeter of 10 mm to 100 mm. In some embodiments, the inner region of the first surface of the membrane of the article has a perimeter of 10 mm to 50 mm. In some embodiments, the inner region of the first surface of the membrane of the article has a perimeter of 10 mm to 25 mm.

In some embodiments, the inner region of the first surface of the membrane of the article has a perimeter of 25 mm to 250 mm. In some embodiments, the inner region of the first surface of the membrane of the article has a perimeter of 50 mm to 200 mm. In some embodiments, the inner region of the first surface of the membrane of the article has a perimeter of 100 mm to 150 mm.

In some embodiments, the inner region of the first surface of the membrane of the article has an area to perimeter ratio of 0.3:1 to 9:1. In some embodiments, the inner region of the first surface of the membrane of the article has an area to perimeter ratio of 0.5:1 to 9:1. In some embodiments, the inner region of the first surface of the membrane of the article has an area to perimeter ratio of 1:1 to 9:1. In some embodiments, the inner region of the first surface of the membrane of the article has an area to perimeter ratio of 2:1 to 9:1. In some embodiments, the inner region of the first surface of the membrane of the article has an area to perimeter ratio of 5:1 to 9:1. In some embodiments, the inner region of the first surface of the membrane of the article has an area to perimeter ratio of 8:1 to 9:1.

In some embodiments, the inner region of the first surface of the membrane of the article has an area to perimeter ratio of 0.3:1 to 8:1. In some embodiments, the inner region of the first surface of the membrane of the article has an area to perimeter ratio of 0.3:1 to 5:1. In some embodiments, the inner region of the first surface of the membrane of the article has an area to perimeter ratio of 0.3:1 to 2:1. In some embodiments, the inner region of the first surface of the membrane of the article has an area to perimeter ratio of 0.3:1 to 1:1. In some embodiments, the inner region of the first surface of the membrane of the article has an area to perimeter ratio of 0.3:1 to 0.5:1.

In some embodiments, the inner region of the first surface of the membrane of the article has an area to perimeter ratio of 0.5:1 to 8:1. In some embodiments, the inner region of the first surface of the membrane of the article has an area to perimeter ratio of 1:1 to 5:1. In some embodiments, the inner region of the first surface of the membrane of the article has an area to perimeter ratio of 2:1.

In some embodiments, the inner region of the first surface of the membrane of the article has a curved diamond shape, a four-tab-jigsaw shape, an eight-tab-jigsaw shape, or a sawtooth shape.

In some embodiments, the inner region of the first surface of the membrane of the article has a rectangular curved diamond shape, a rectangular four-tab-jigsaw shape, a rectangular eight-tab-jigsaw shape, or a rectangular sawtooth shape.

Non-limiting examples of articles having some of the aforementioned shapes are shown in FIGS. 1A through 6D, which are described herein in further detail, infra. The aforementioned shapes are examples of possible shapes that may have suitable geometric characteristics (e.g., area, perimeter, area to perimeter ratio) and are not meant to be limiting or exhaustive. One skilled in the art reading the present disclosure will understand that additional shapes within the scope of the present disclosure can be created without undue experimentation.

Turning now to the outer region of the first surface of the membrane, in some embodiments, the adhesive layer that is disposed on the outer region of the first surface of the membrane may comprise at least one adhesive chosen from a silicone adhesive, an acrylic adhesive, or any combination thereof.

Non-limiting embodiments of suitable, commercially available, silicone adhesives include, item #96042 from 3M® and item # FT9350 from Avery®. Non-limiting embodiments of suitable, commercially available, acrylic adhesives include item Nos. 82600 82601 82602 82603 82605 82610 82620 from 3M®. Non-limiting embodiments of suitable, commercially available, combined silicone/acrylic adhesives include Nos. 9731, 9119-50, 9119-85, 9119-100, and 9119-140 from 3M®.

In some embodiments, the adhesive layer is present on an entirety of the area of the outer region of the first surface of the membrane. In some embodiments, the adhesive layer is present only on some portions of the area of the outer region of the first surface of the membrane.

In some embodiments, the adhesive layer is present on 1% to 100% of an area of the area of the outer region of the first surface of the membrane. In some embodiments, the adhesive layer is present on 25% to 100% of the area of the outer region of the first surface of the membrane. In some embodiments, the adhesive layer is present on 50% to 100% of the area of the outer region of the first surface of the membrane. In some embodiments, the adhesive layer is present on 75% to 100% of the area of the outer region of the first surface of the membrane.

In some embodiments, the adhesive layer is present on 1% to 75% of the area of the outer region of the first surface of the membrane. In some embodiments, the adhesive layer is present on 1% to 50% of the area of the outer region of the first surface of the membrane. In some embodiments, the adhesive layer is present on 1% to 25% of the area of the outer region of the first surface of the membrane.

In some embodiments, the adhesive layer is present on 25% to 75% of the area of the outer region of the first surface of the membrane. In some embodiments, the adhesive layer is present on 50% of the area of the outer region of the first surface of the membrane.

In some embodiments, the membrane comprises a second surface opposite the first surface. In some embodiments, the second surface of the membrane consists of a single region. In some embodiments, the second surface of the membrane comprises multiple regions.

In some embodiments, the second surface of the membrane does not comprise an adhesive layer. In some embodiments, the second surface of the membrane comprises an adhesive layer. In some embodiments where the second surface of the membrane comprises an adhesive layer, the adhesive layer may be the same as the adhesive layer on the first surface of the membrane. In some embodiments where the second surface of the membrane comprises an adhesive layer, the adhesive layer may be different from the adhesive layer on the first surface of the membrane.

Figure 1B:
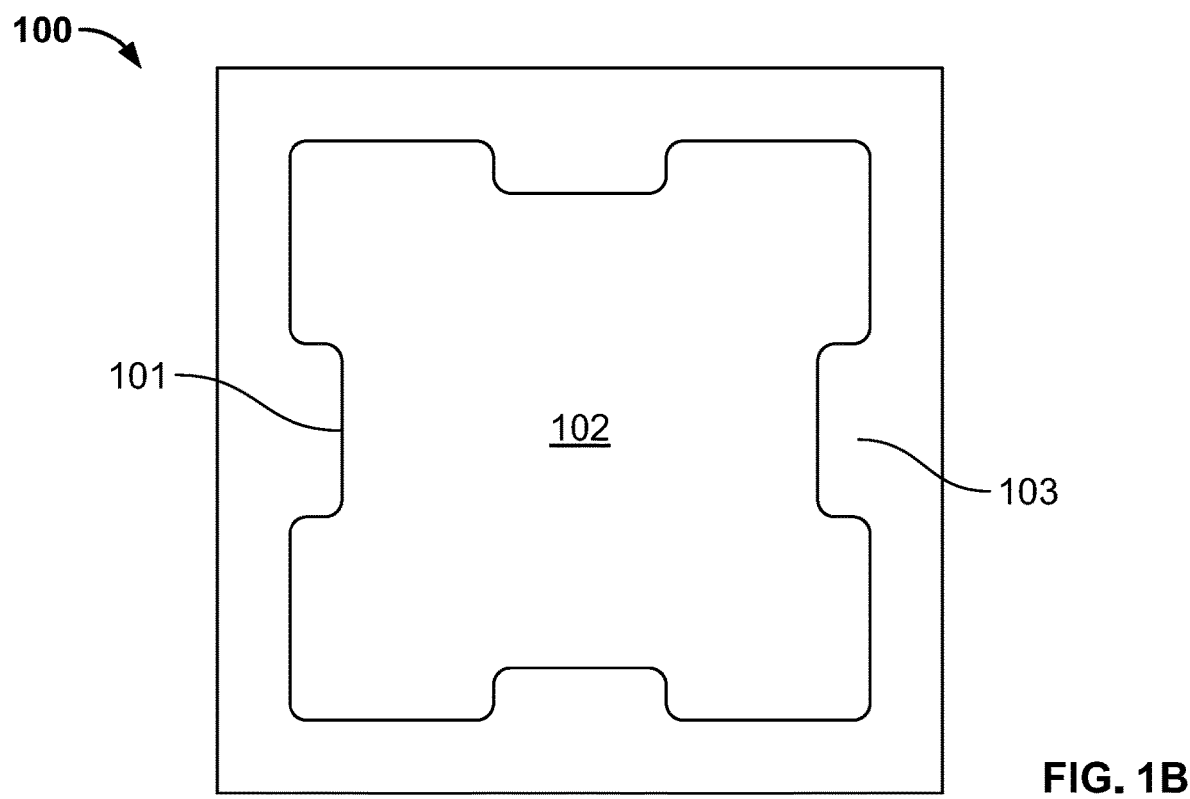
FIG. 1B is a view of a first surface of the exemplary article having the four-tab-jigsaw shape.
Figure 1C:
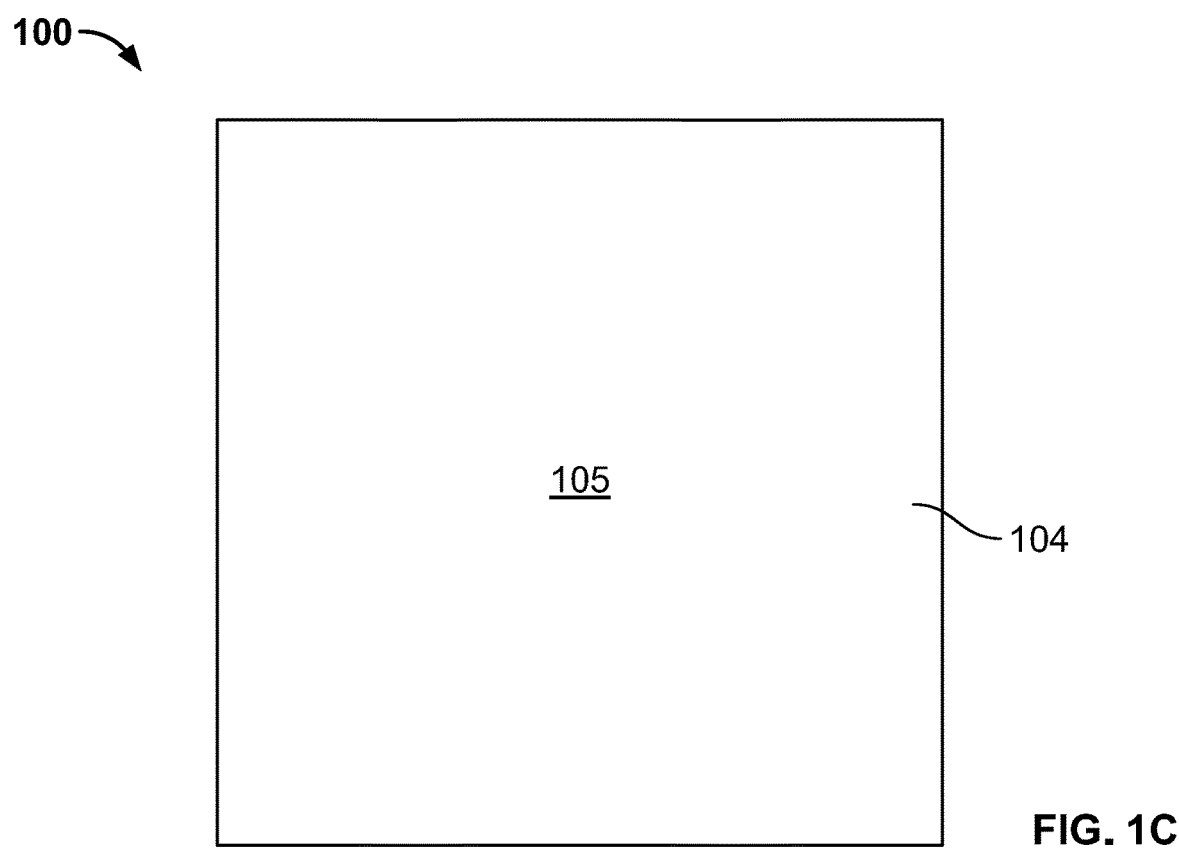
FIG. 1C is a view of the second surface of the exemplary article having the four-tab-jigsaw shape.
Figure 1D:
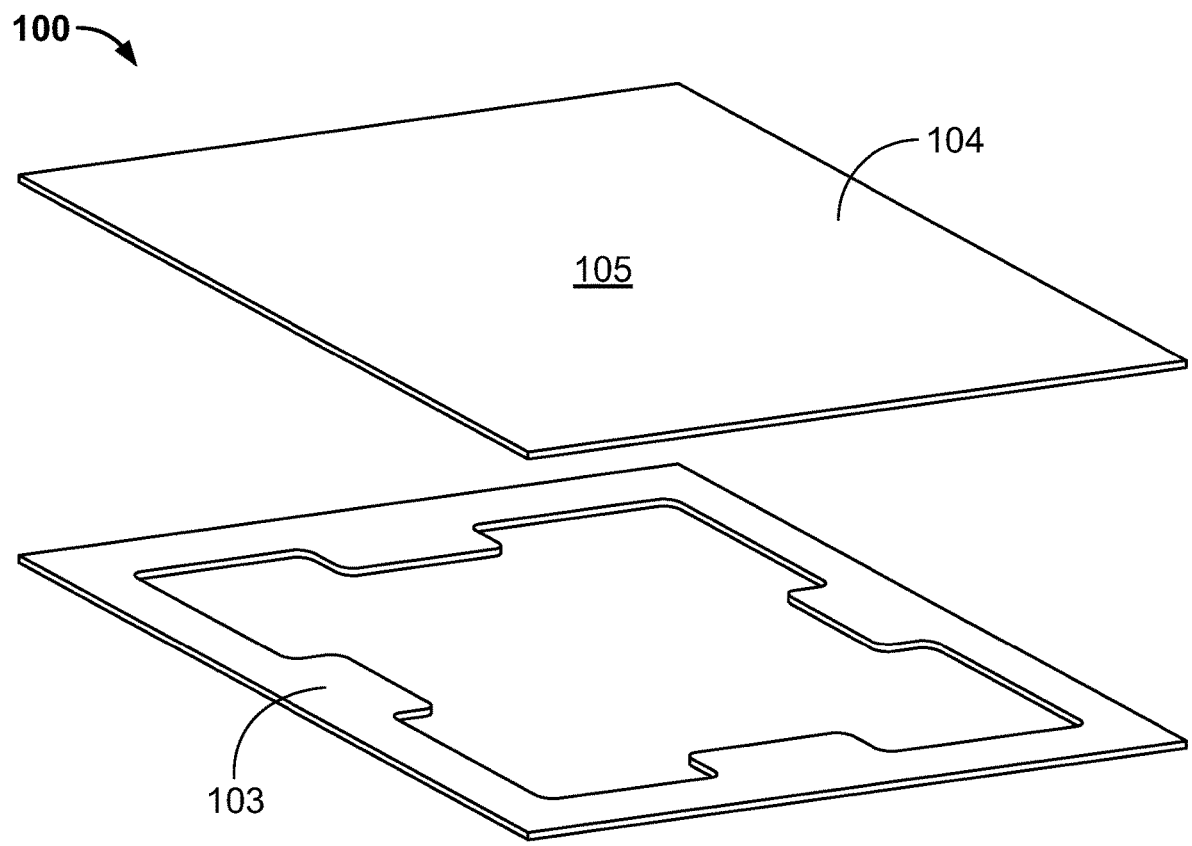
FIG. 1D is an exploded perspective view of an exemplary article having a four-tab-jigsaw shape.

A first non-limiting example of an article according to the present disclosure is shown in FIGS. 1A to 1D. FIG. 1A is a perspective view of a first surface of an exemplary article having a four-tab-jigsaw shape. FIG. 1B is a view of a first surface of the exemplary article having the four-tab-jigsaw shape. FIG. 1C is a view of the second surface of the exemplary article having the four-tab-jigsaw shape. FIG. 1D is an exploded perspective view of an exemplary article having a four-tab-jigsaw shape.

As shown in FIGS. 1A and 1B, an article 100 may include a membrane having a first surface 101 with an exemplary four-tab-jigsaw-shaped inner region 102. As shown in FIGS. 1A, 1B, and 1D, the first surface 101 may further include an outer region that includes adhesive layer 103. As shown in FIGS. 1C and 1D, in some embodiments the article 100 can include a second surface 104 opposite the first surface 101. In some embodiments, the second surface 104 can consist of a single region 105.

Figure 2A:
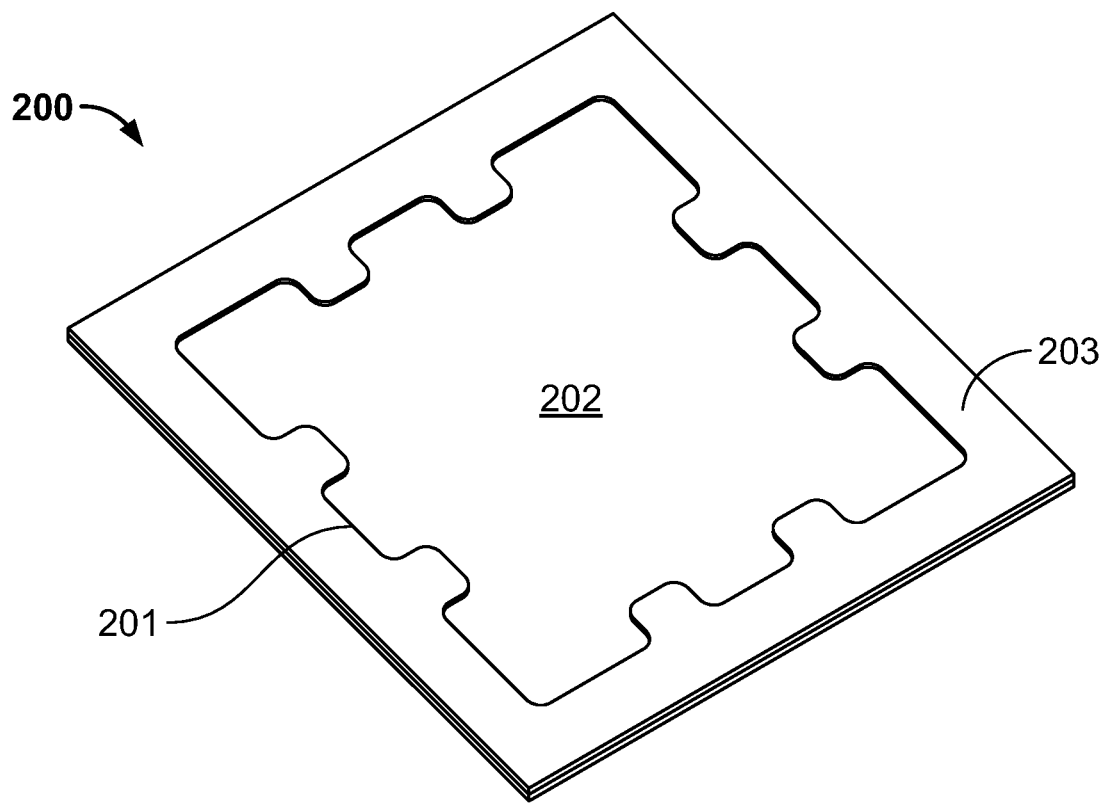
FIG. 2A is a perspective view of a first surface of an exemplary article having an eight-tab-jigsaw shape.
Figure 2B:
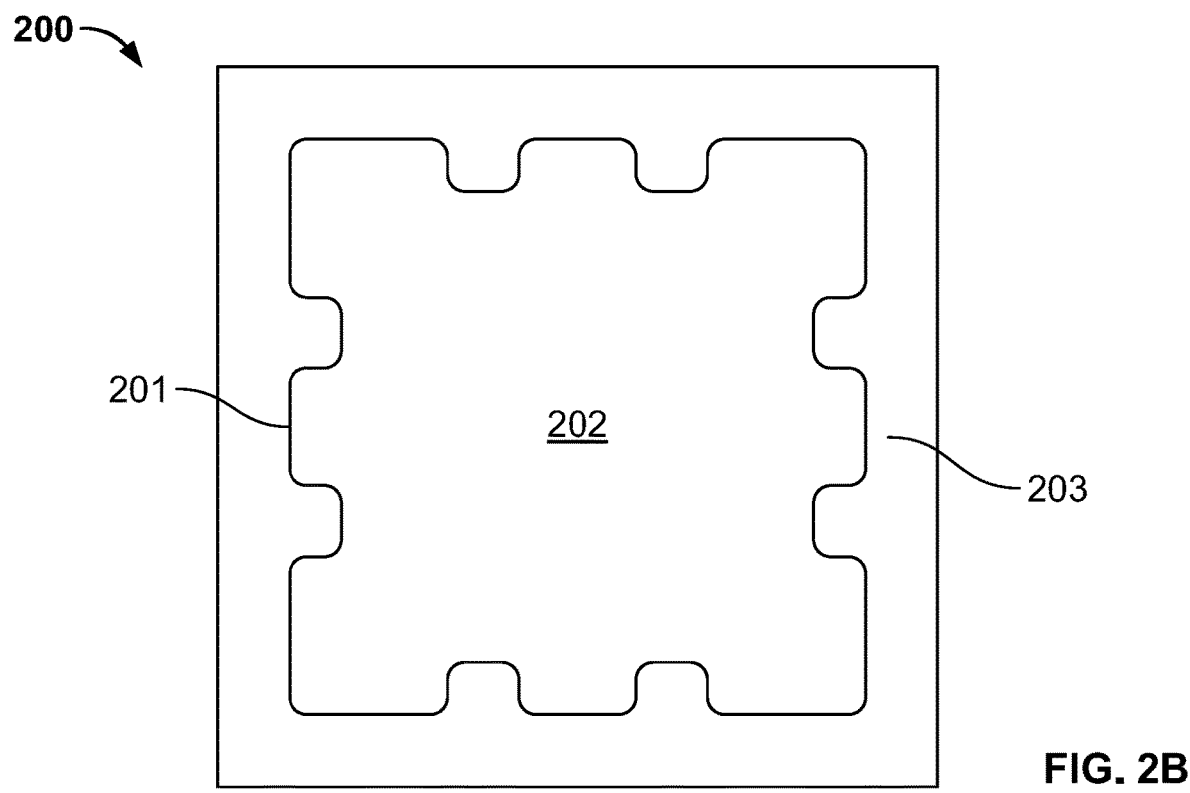
FIG. 2B is a view of a first surface of the exemplary article having the eight-tab-jigsaw shape.
Figure 2C:
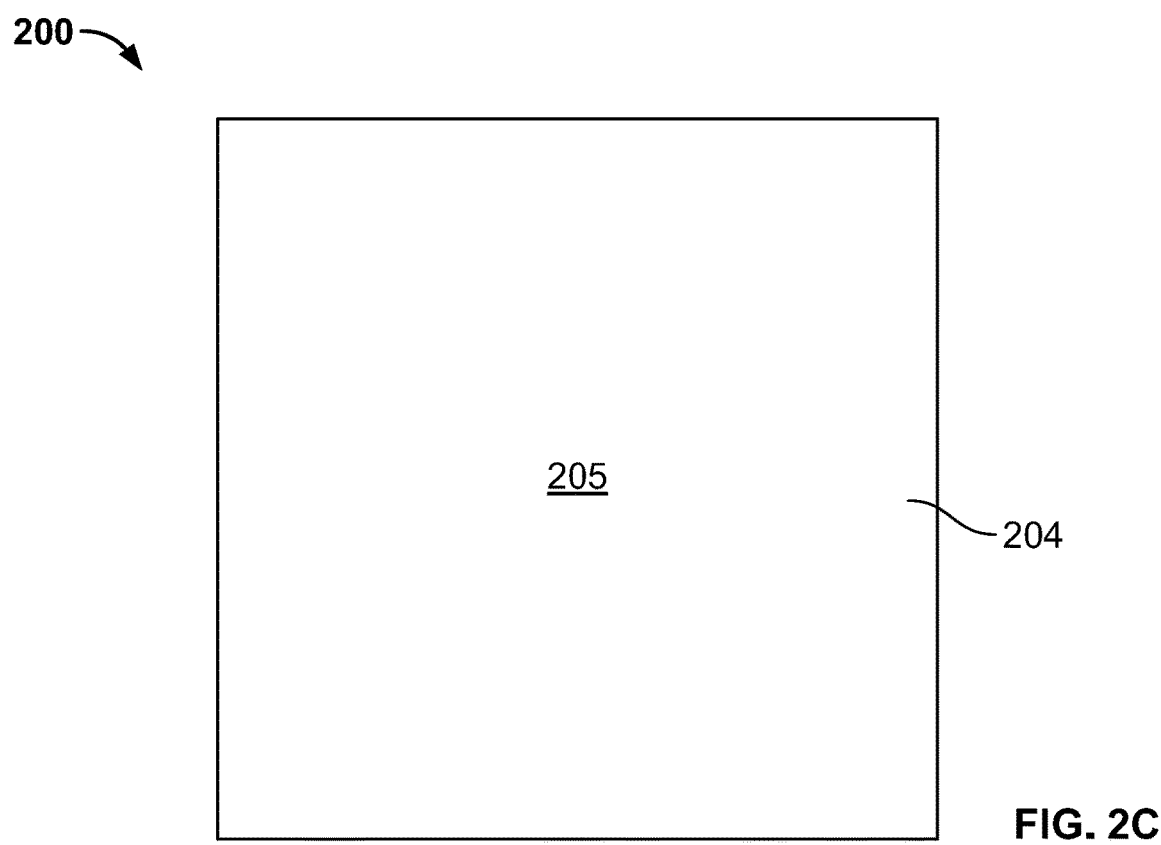
FIG. 2C is a view of the second surface of the exemplary article having the eight-tab-jigsaw shape.
Figure 2D:
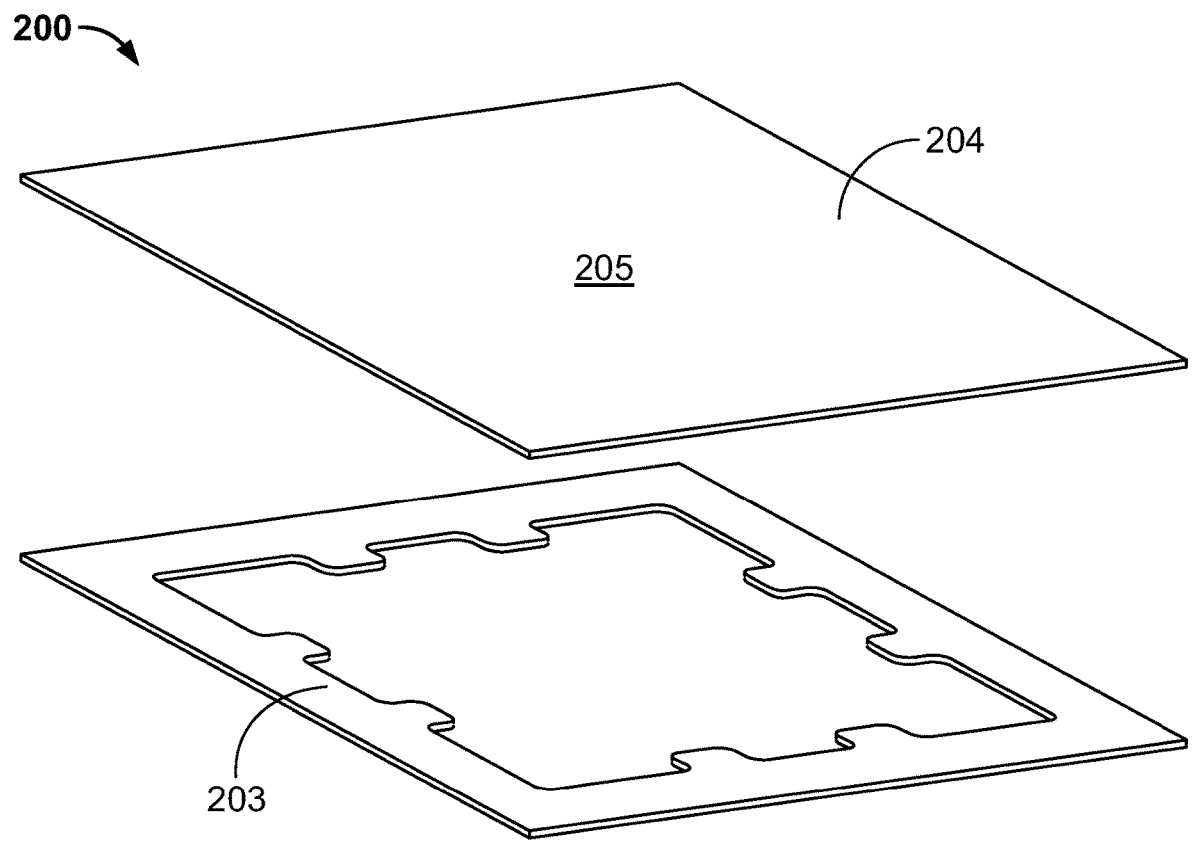
FIG. 2D is an exploded perspective view of an exemplary article having the eight-tab-jigsaw shape.

A second non-limiting example of an article according to the present disclosure is shown in FIGS. 2A to 2D. FIG. 2A is a perspective view of a first surface of an exemplary article having an eight-tab-jigsaw shape. FIG. 2B is a view of a first surface of the exemplary article having the eight-tab-jigsaw shape. FIG. 2C is a view of the second surface of the exemplary article having the eight-tab-jigsaw shape. FIG. 2D is an exploded perspective view of an exemplary article having the eight-tab-jigsaw shape.

As shown in FIGS. 2A and 2B, an article 200 may include a membrane having a first surface 201 with an exemplary eight-tab-jigsaw-shaped inner region 202. As shown in FIGS. 2A, 2B, and 2D, the first surface 201 may further include an outer region that includes adhesive layer 203. As shown in FIGS. 2C and 2D, in some embodiments the article 200 can include a second surface 204 opposite the first surface 201. In some embodiments, the second surface 204 can consist of a single region 205.

Figure 3A:
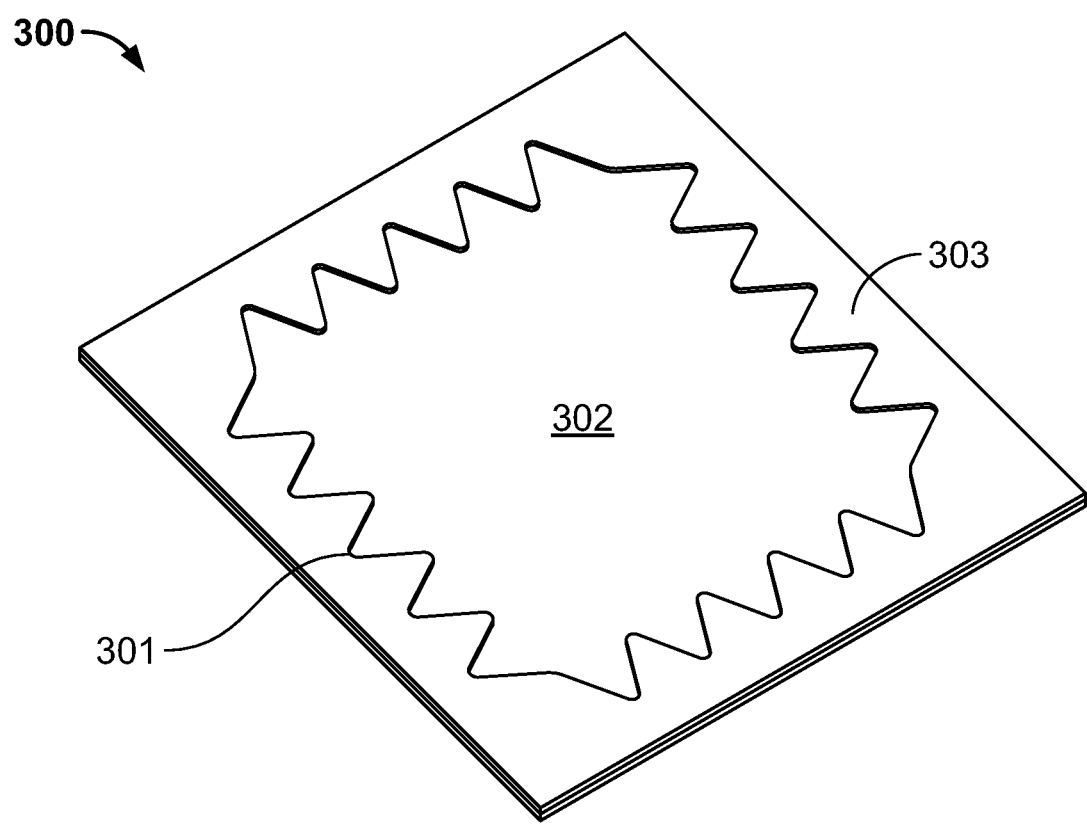
FIG. 3A is a perspective view of a first surface of an exemplary article having a sawtooth shape.
Figure 3B:
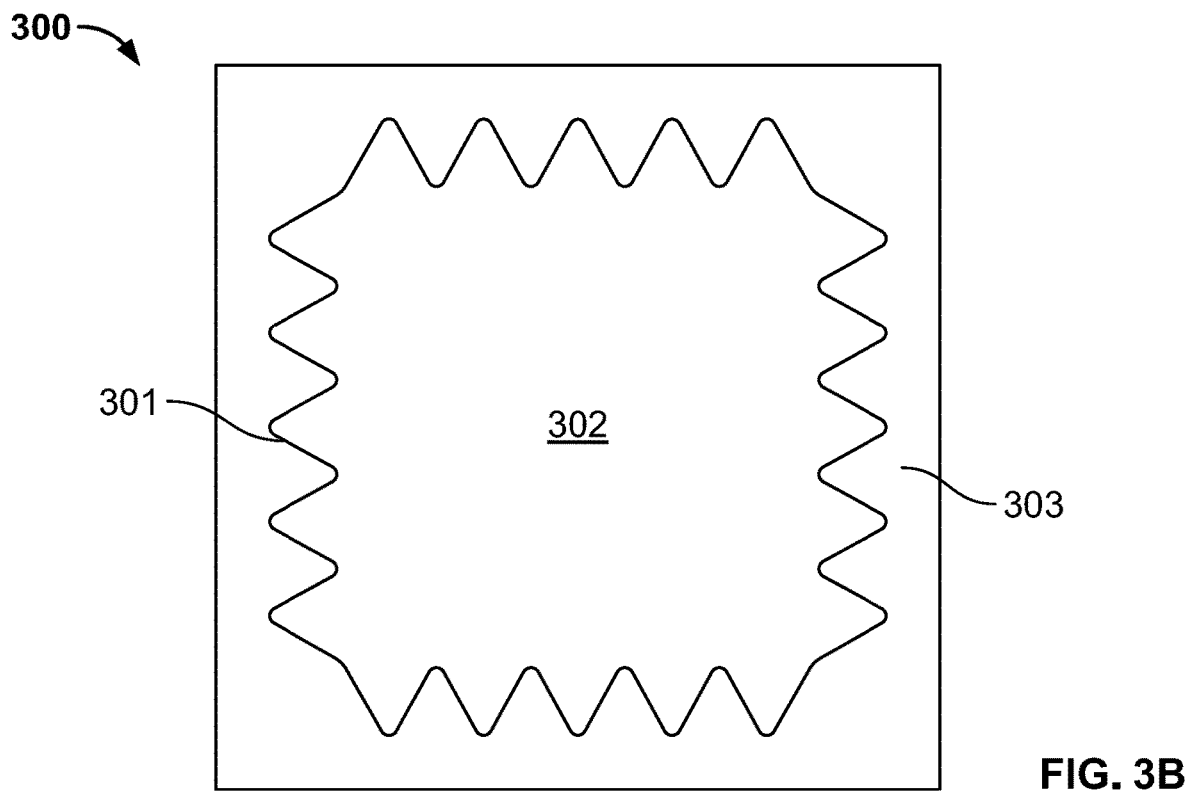
FIG. 3B is a view of a first surface of the exemplary article having the sawtooth shape.
Figure 3C:
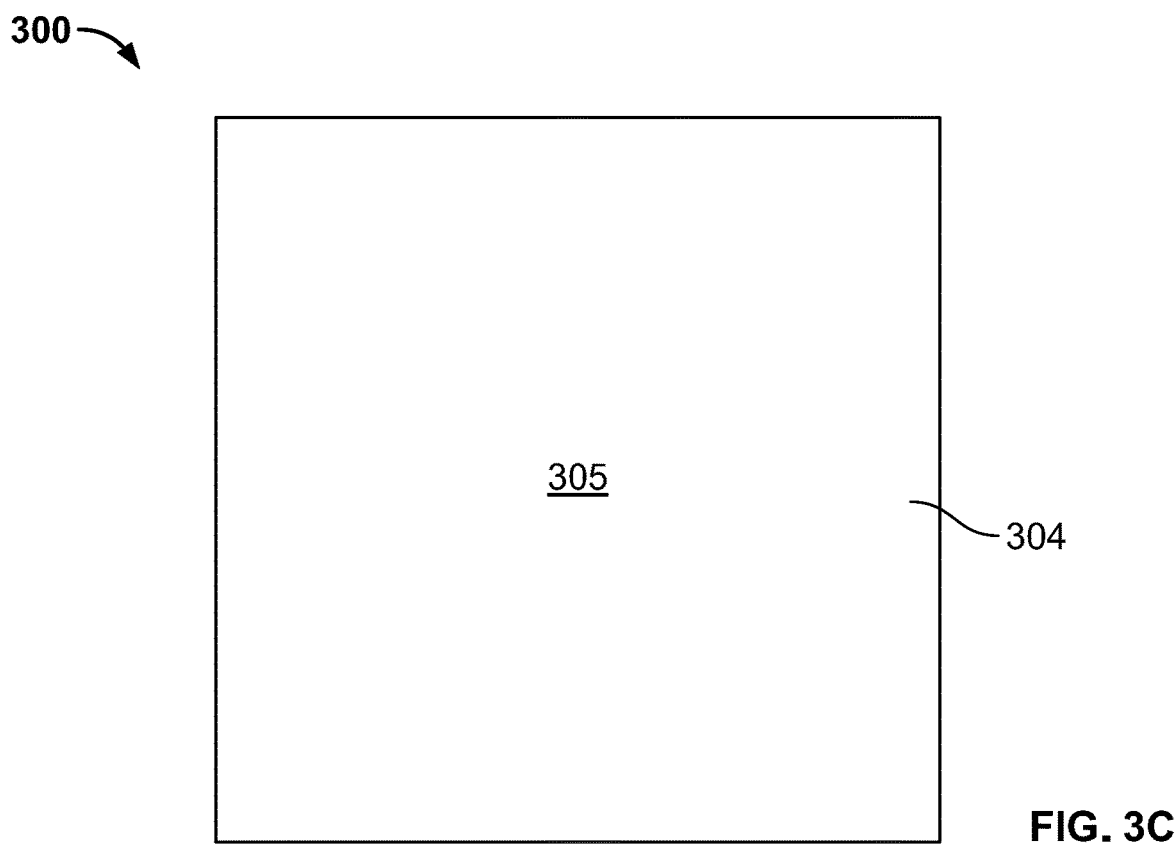
FIG. 3C is a view of the second surface of the exemplary article having the sawtooth shape.
Figure 3D:
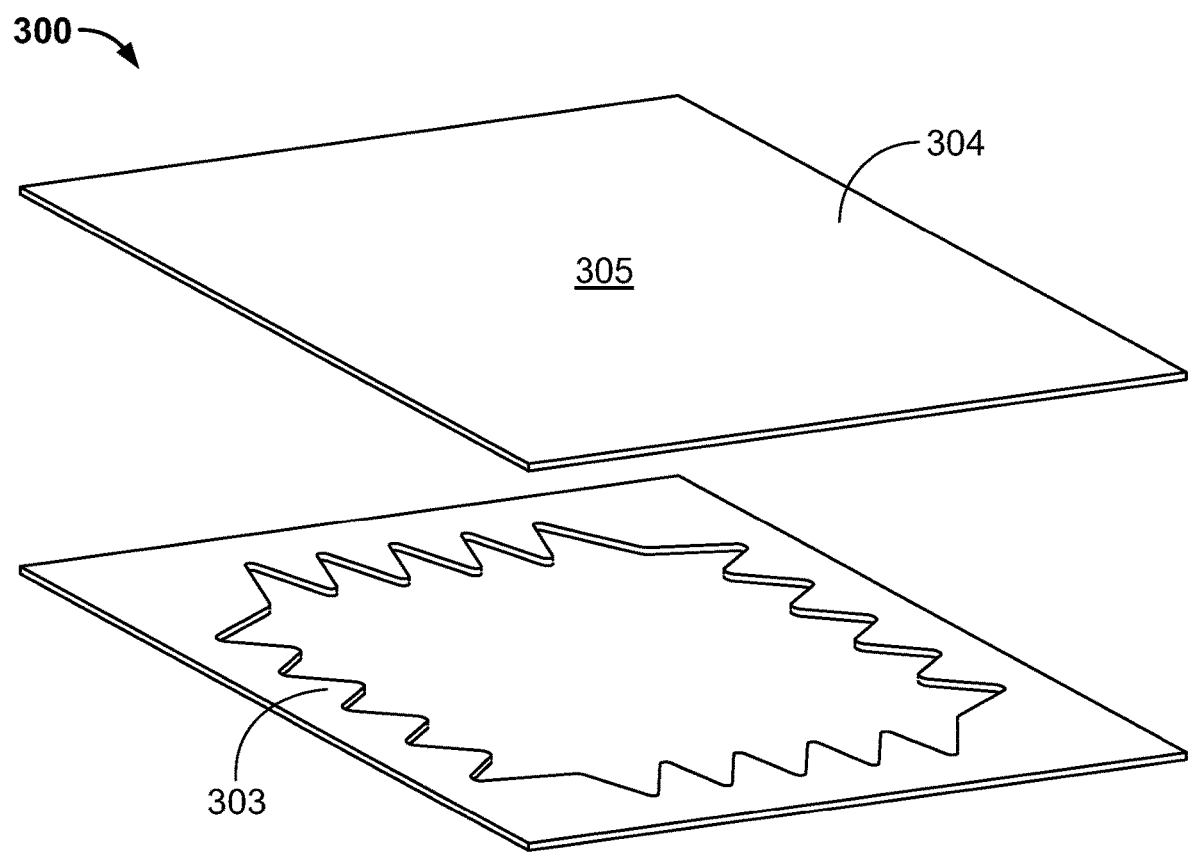
FIG. 3D is an exploded perspective view of an exemplary article having the sawtooth shape.

A third non-limiting example of an article according to the present disclosure is shown in FIGS. 3A to 3D. FIG. 3A is a perspective view of a first surface of an exemplary article having a sawtooth shape. FIG. 3B is a view of a first surface of the exemplary article having the sawtooth shape. FIG. 3C is a view of the second surface of the exemplary article having the sawtooth shape. FIG. 3D is an exploded perspective of an exemplary article having the sawtooth shape.

As shown in FIGS. 3A and 3B, an article 300 may include a membrane having a first surface 301 with an exemplary sawtooth shaped inner region 302. As shown in FIGS. 3A, 3B, and 3D, the first surface 301 may further include an outer region that includes adhesive layer 303. As shown in FIGS. 3C and 3D, in some embodiments the article 300 can include a second surface 304 opposite the first surface 301. In some embodiments, the second surface 304 can consist of a single region 305.

Figure 4A:
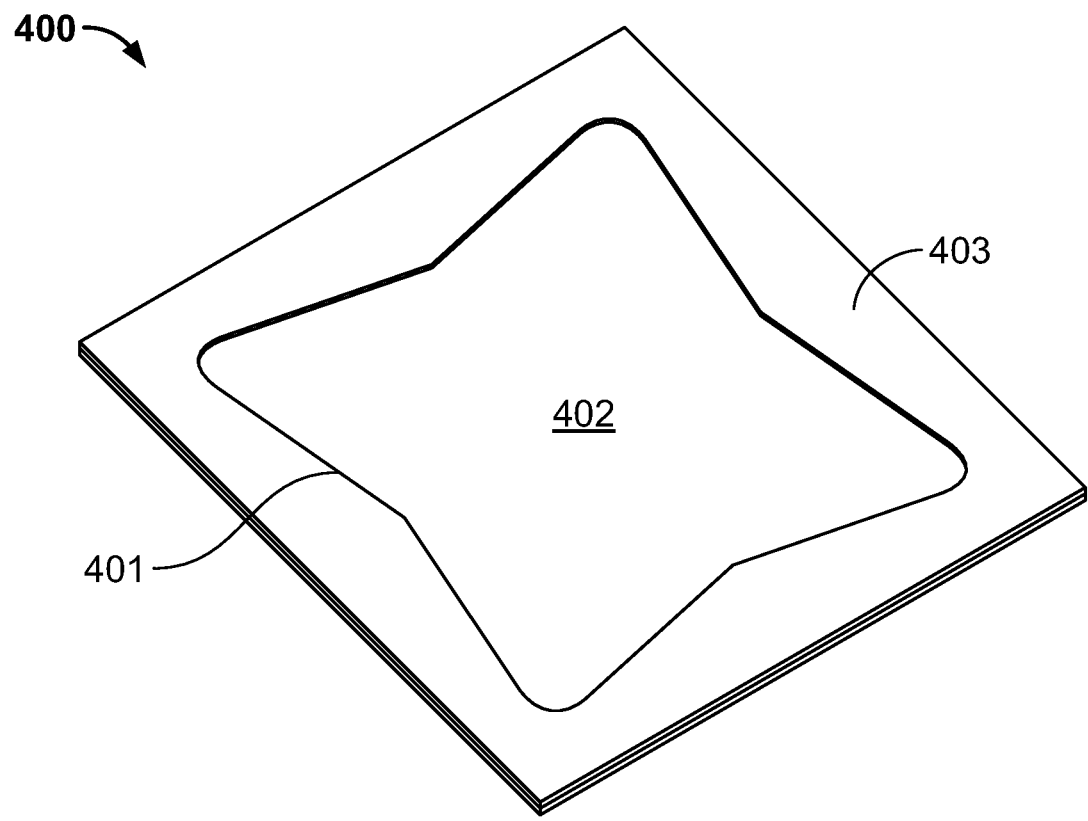
FIG. 4A is a perspective view of a first surface of an exemplary article having a curved diamond shape.
Figure 4B:
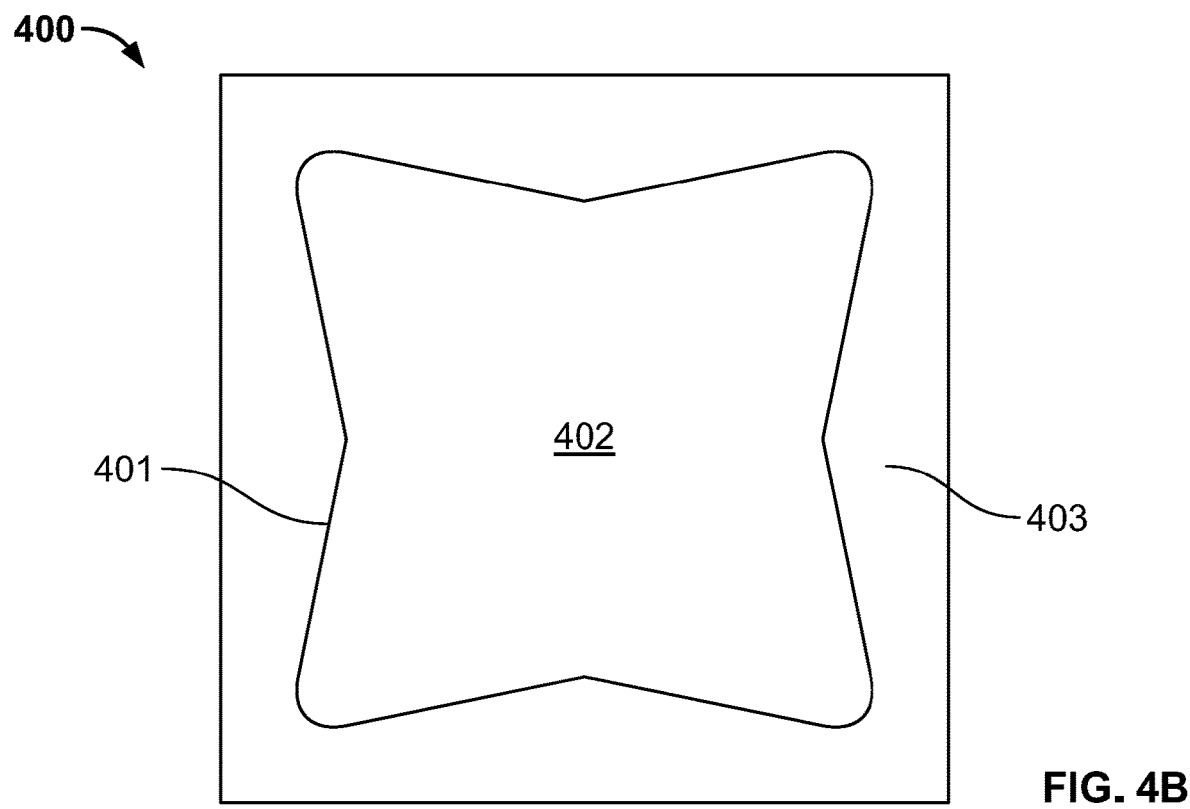
FIG. 4B is a view of a first surface of the exemplary article having the curved diamond shape.
Figure 4C:
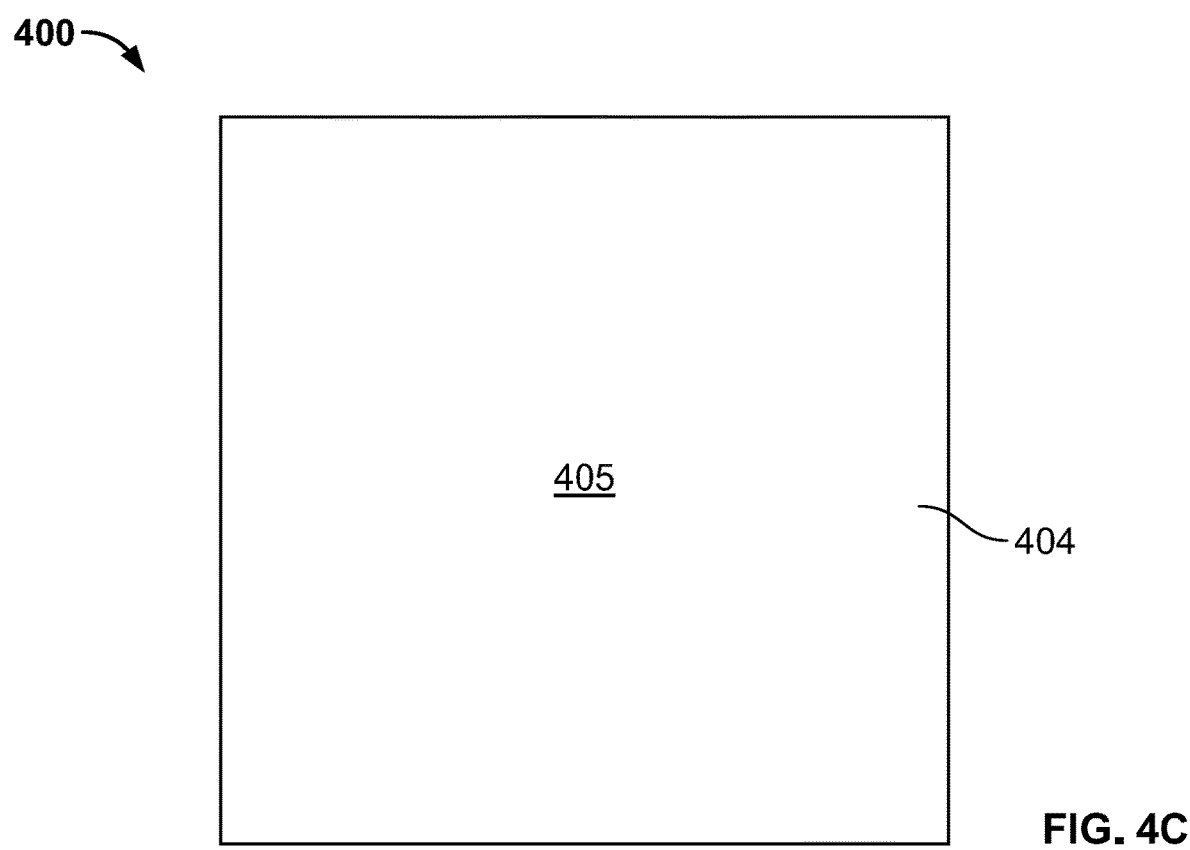
FIG. 4C is a view of the second surface of the exemplary article having the curved diamond shape.
Figure 4D:
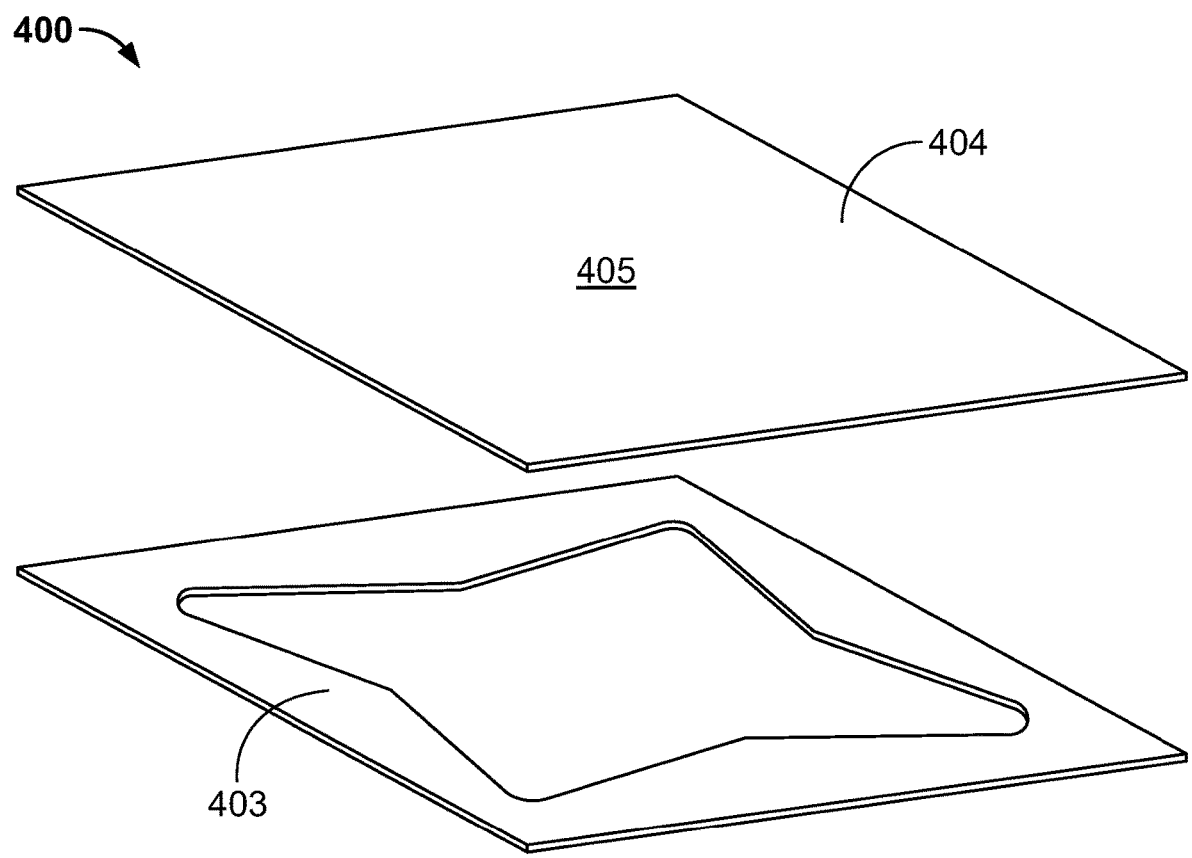
FIG. 4D is an exploded perspective view of an exemplary article having the curved diamond shape.

A fourth non-limiting example of an article according to the present disclosure is shown in FIGS. 4A to 4D. FIG. 4A is a perspective view of a first surface of an exemplary article having a curved diamond shape. FIG. 4B is a view of a first surface of the exemplary article having the curved diamond shape. FIG. 4C is a view of the second surface of the exemplary article having the curved diamond shape. FIG. 4D is an exploded perspective view of an exemplary article having the curved diamond shape.

As shown in FIGS. 4A and 4B, an article 400 may include a membrane having a first surface 401 with an exemplary curved diamond shaped inner region 402. As shown in FIGS. 4A, 4B, and 4D, the first surface 401 may further include an outer region that includes adhesive layer 403. As shown in FIGS. 4C and 4D, in some embodiments the article 400 can include a second surface 404 opposite the first surface 401. In some embodiments, the second surface 404 can consist of a single region 405.

Figure 5A:
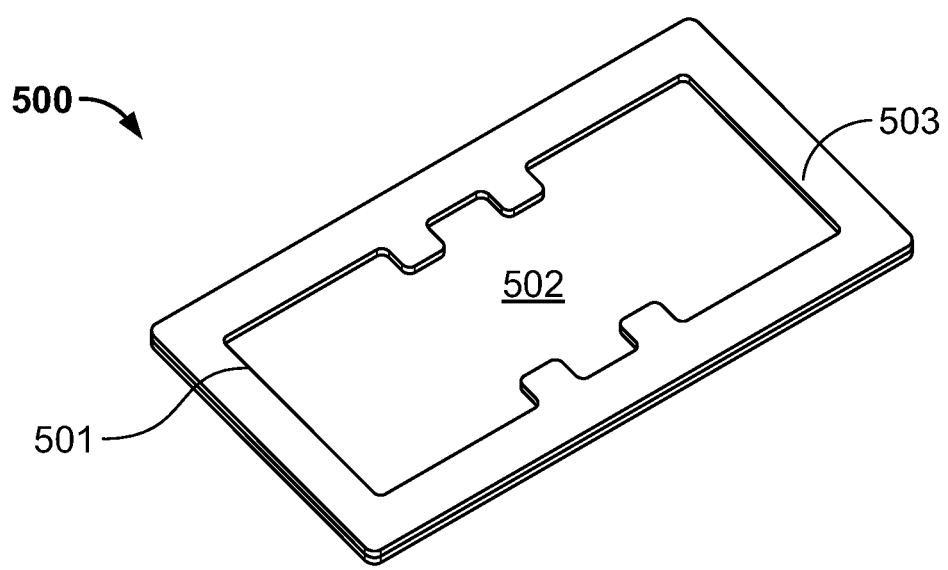
FIG. 5A is a perspective view of a first surface of an exemplary article having a rectangular four-tab-jigsaw shape.
Figure 5B:
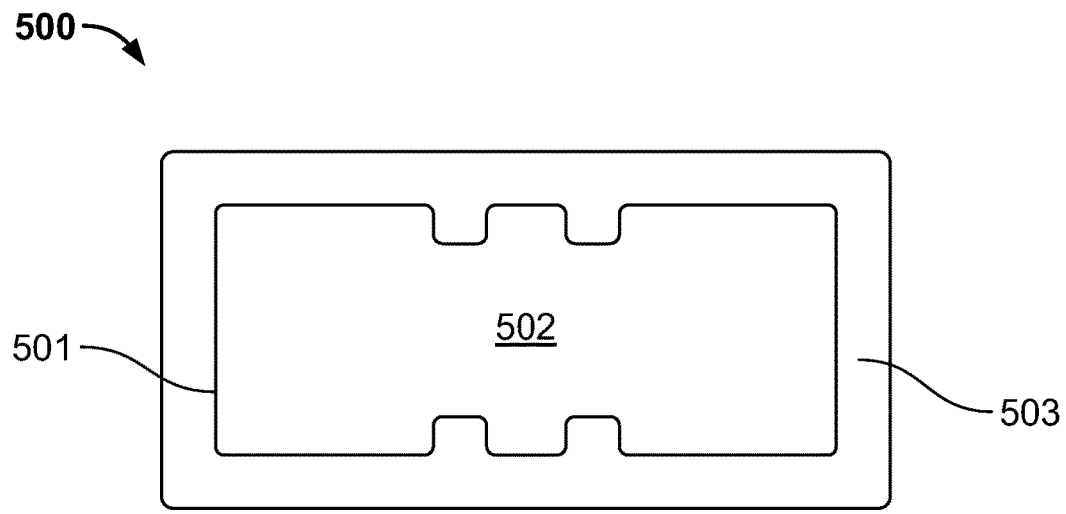
FIG. 5B is a view of a first surface of the exemplary article having the rectangular four-tab-jigsaw shape.
Figure 5C:
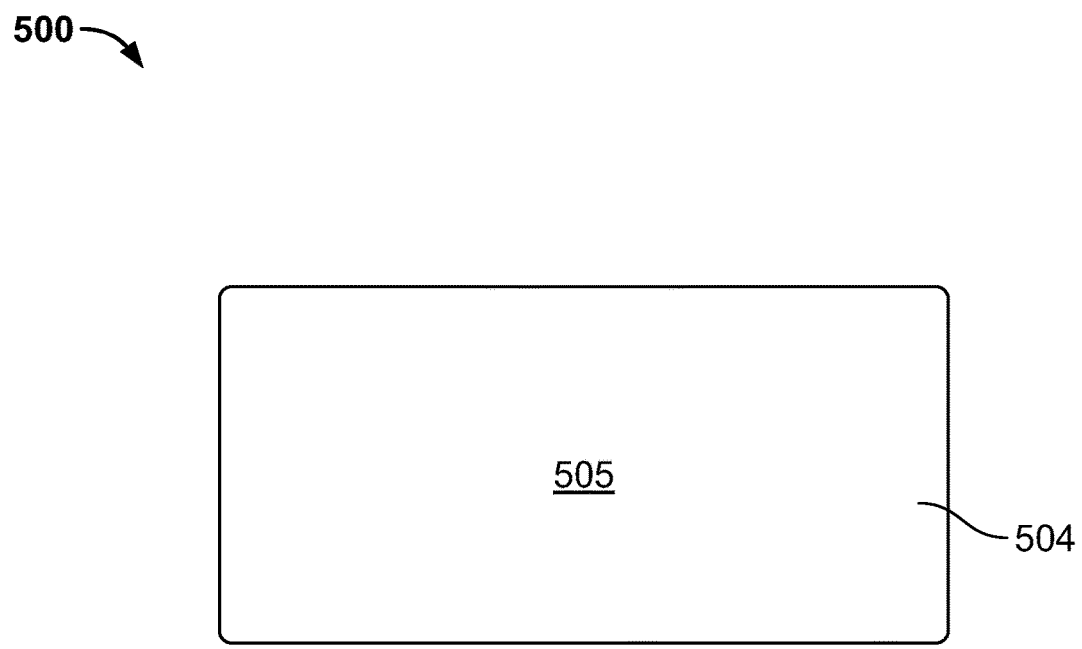
FIG. 5C is a view of the second surface of the exemplary article having the rectangular four-tab-jigsaw shape.
Figure 5D:
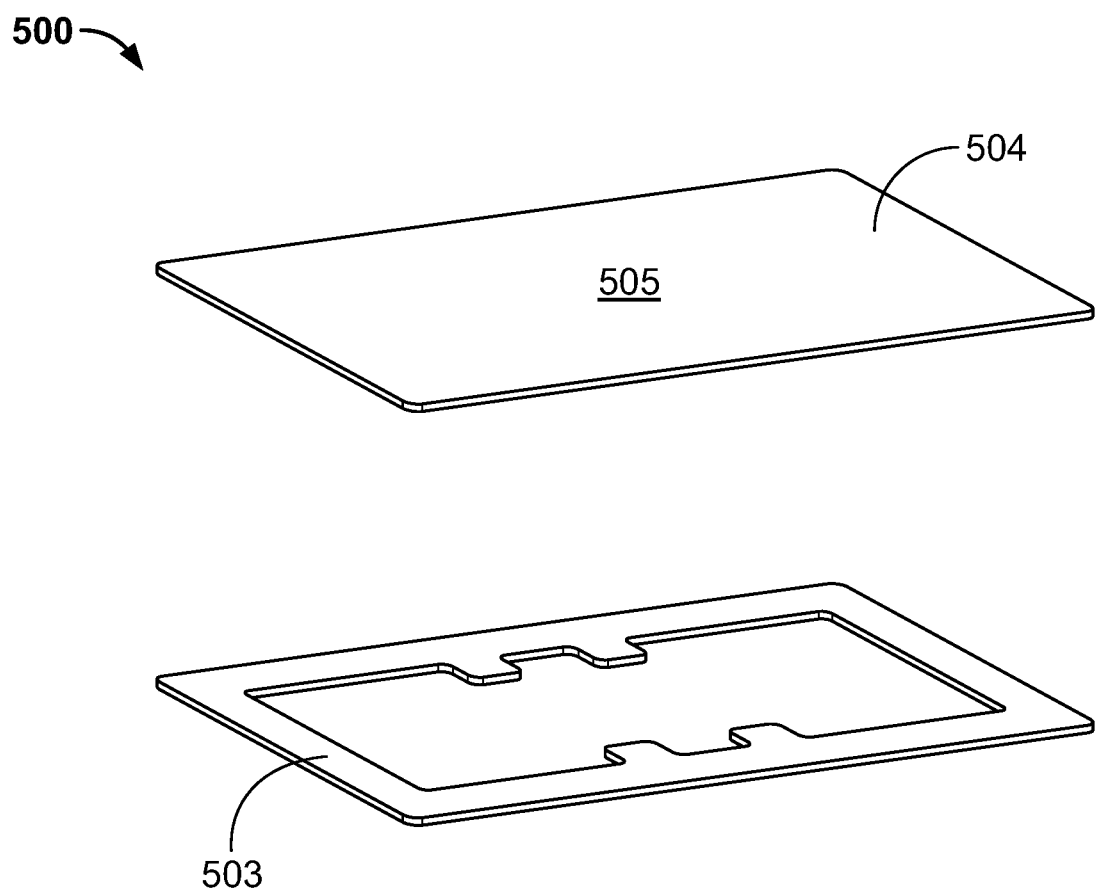
FIG. 5D is an exploded perspective view of an exemplary article having the rectangular four-tab-jigsaw shape.

A fifth non-limiting example of an article according to the present disclosure is shown in FIGS. 5A to 5D. FIG. 5A is a perspective view of a first surface of an exemplary article having a rectangular 4-tab-jigsaw shape. FIG. 5B is a view of a first surface of the exemplary article having the rectangular 4-tab-jigsaw shape. FIG. 5C is a view of the second surface of the exemplary article having the rectangular 4-tab-jigsaw shape. FIG. 5D is an exploded perspective view of an exemplary article having the rectangular 4-tab-jigsaw shape.

As shown in FIGS. 5A and 5B, an article 500 may include a membrane having a first surface 501 with an exemplary rectangular 4-tab-jigsaw shaped inner region 502. As shown in FIGS. 5A, 5B, and 5D, the first surface 501 may further include an outer region that includes adhesive layer 503. As shown in FIGS. 5C and 5D, in some embodiments the article 500 can include a second surface 504 opposite the first surface 501. In some embodiments, the second surface 504 can consist of a single region 505.

Figure 6A:
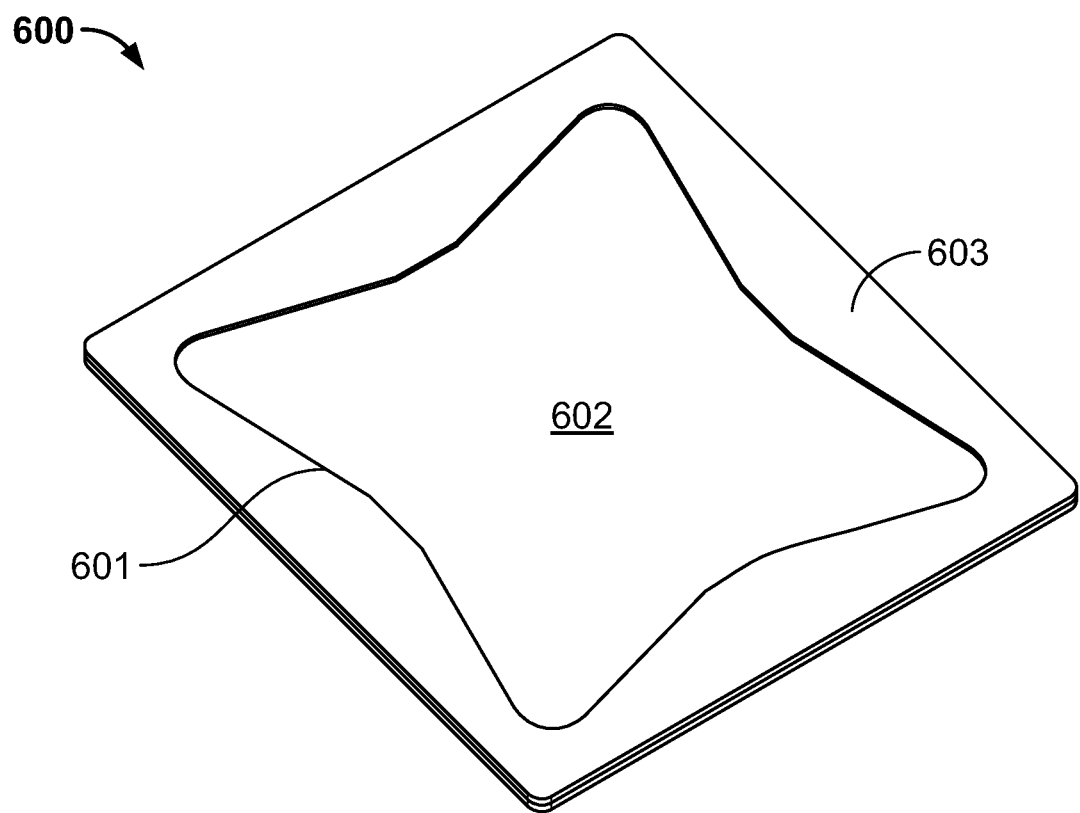
FIG. 6A is a perspective view of a first surface of an additional exemplary article having a curved diamond shape.
Figure 6B:
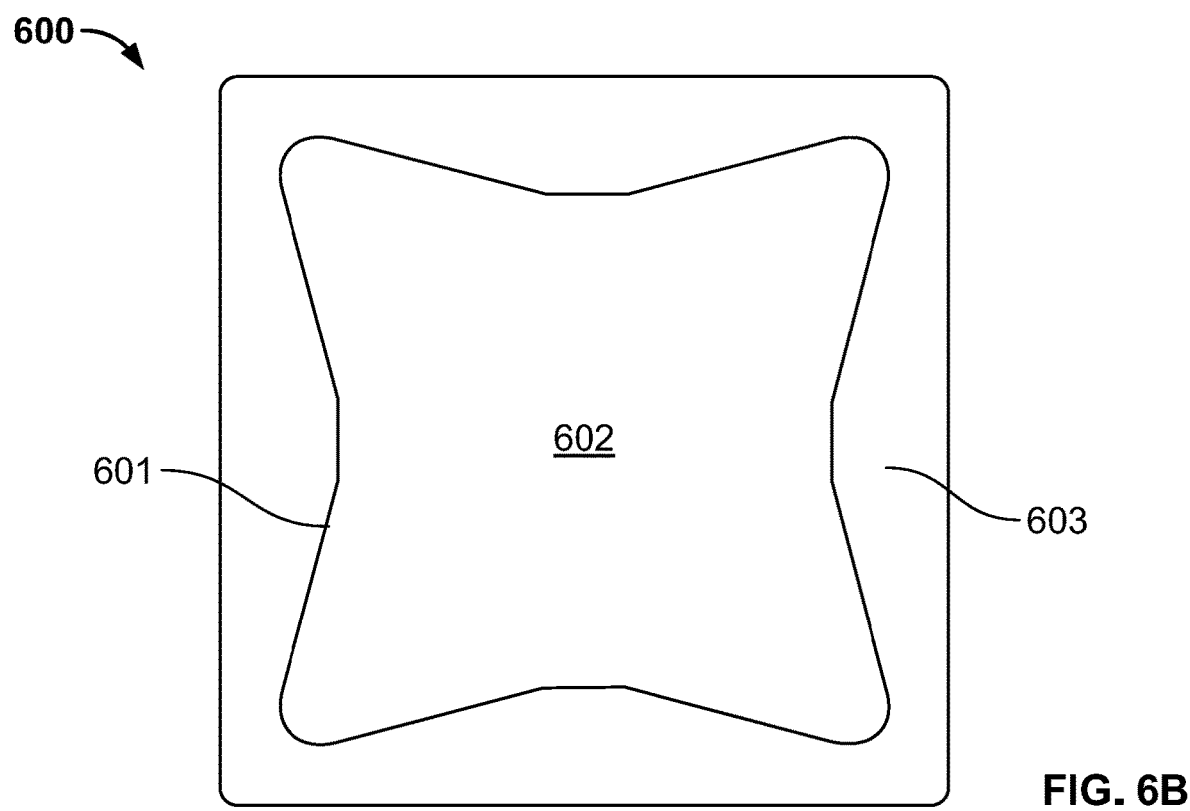
FIG. 6B is a view of a first surface of the additional exemplary article having the curved diamond shape.
Figure 6C:
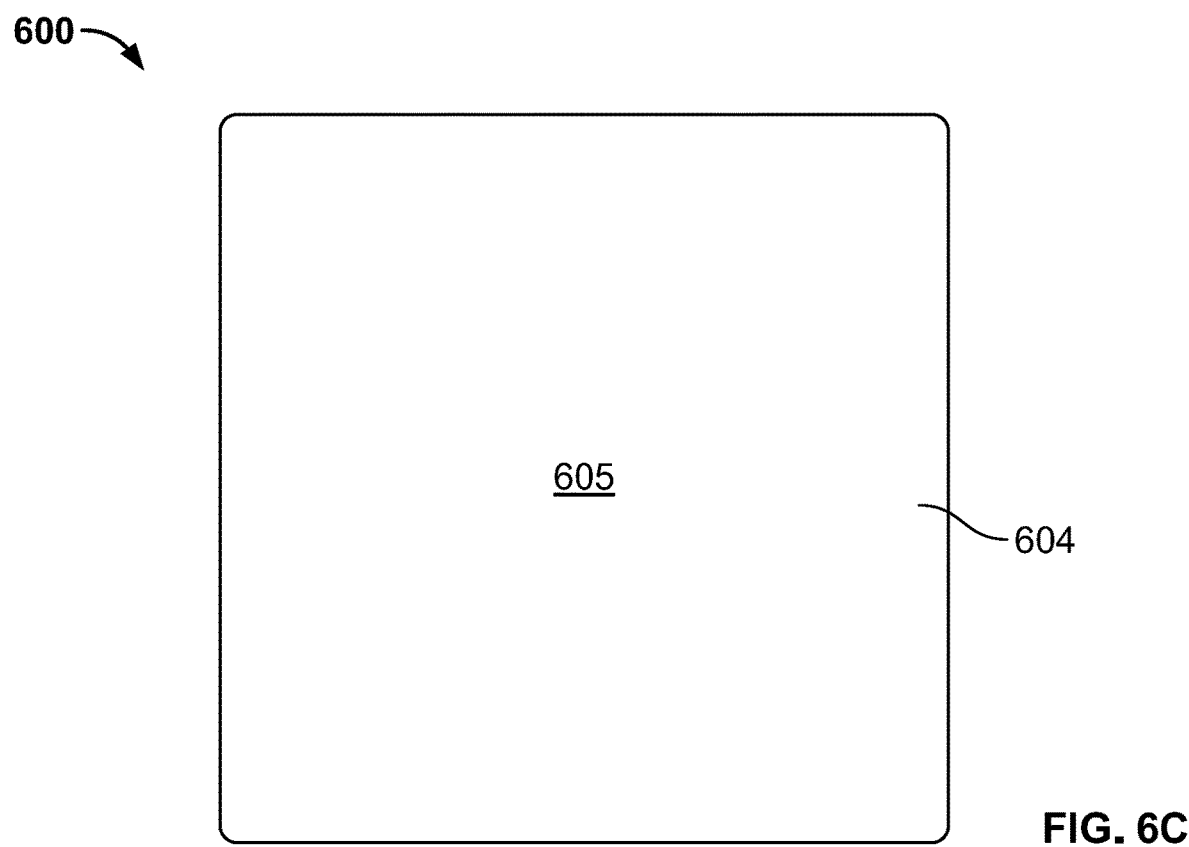
FIG. 6C is a view of the second surface of the additional exemplary article having the curved diamond shape.
Figure 6D:
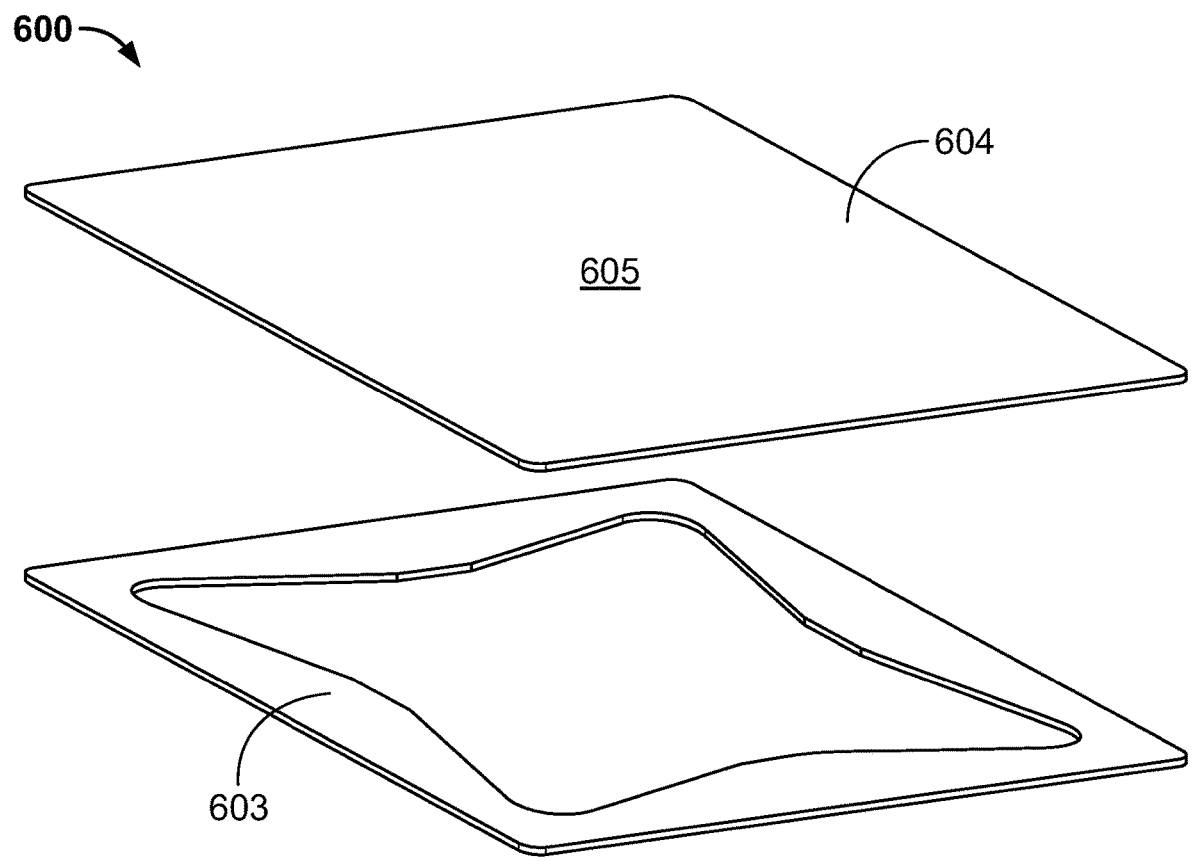
FIG. 6D is an exploded perspective view of the additional exemplary article having the curved diamond shape.

A sixth non-limiting example of an article according to the present disclosure is shown in FIGS. 6A to 6D. FIG. 6A is a perspective view of a first surface of an additional exemplary article having a curved diamond shape. FIG. 6B is a view of a first surface of the additional exemplary article having the curved diamond shape. FIG. 6C is a view of the second surface of the additional exemplary article having the curved diamond shape. FIG. 6D is an exploded perspective view of the additional exemplary article having the curved diamond shape.

As shown in FIGS. 6A and 6B, an article 600 may include a membrane having a first surface 601 with an exemplary curved diamond shaped inner region 602. As shown in FIGS. 6A, 6B, and 6D, the first surface 601 may further include an outer region that includes adhesive layer 603. As shown in FIGS. 6C and 6D, in some embodiments the article 600 can include a second surface 604 opposite the first surface 601. In some embodiments, the second surface 604 can consist of a single region 605.

In some embodiments, the article exhibits a water entry pressure that is 1% to 50% higher than a comparative article when tested according to the Assembly WEP Test described herein, infra. In some embodiments, the article exhibits a water entry pressure that is 5% to 50% higher than a comparative article when tested according to the Assembly WEP Test. In some embodiments, the article exhibits a water entry pressure that is 10% to 50% higher than a comparative article when tested according to the Assembly WEP Test. In some embodiments, the article exhibits a water entry pressure that is 15% to 50% higher than a comparative article when tested according to the Assembly WEP Test. In some embodiments, the article exhibits a water entry pressure that is 20% to 50% higher than a comparative article when tested according to the Assembly WEP Test. In some embodiments, the article exhibits a water entry pressure that is 20% to 50% higher than a comparative article when tested according to the Assembly WEP Test. In some embodiments, the article exhibits a water entry pressure that is 25% to 50% higher than a comparative article when tested according to the Assembly WEP Test. In some embodiments, the article exhibits a water entry pressure that is 30% to 50% higher than a comparative article when tested according to the Assembly WEP Test. In some embodiments, the article exhibits a water entry pressure that is 35% to 50% higher than a comparative article when tested according to the Assembly WEP Test. In some embodiments, the article exhibits a water entry pressure that is 40% to 50% higher than a comparative article when tested according to the Assembly WEP Test. In some embodiments, the article exhibits a water entry pressure that is 45% to 50% higher than a comparative article when tested according to the Assembly WEP Test.

In some embodiments, the article exhibits a water entry pressure that is 1% to 45% higher than a comparative article when tested according to the Assembly WEP Test. In some embodiments, the article exhibits a water entry pressure that is 1% to 40% higher than a comparative article when tested according to the Assembly WEP Test. In some embodiments, the article exhibits a water entry pressure that is 1% to 35% higher than a comparative article when tested according to the Assembly WEP Test. In some embodiments, the article exhibits a water entry pressure that is 1% to 30% higher than a comparative article when tested according to the Assembly WEP Test. In some embodiments, the article exhibits a water entry pressure that is 1% to 25% higher than a comparative article when tested according to the Assembly WEP Test. In some embodiments, the article exhibits a water entry pressure that is 1% to 20% higher than a comparative article when tested according to the Assembly WEP Test. In some embodiments, the article exhibits a water entry pressure that is 1% to 15% higher than a comparative article when tested according to the Assembly WEP Test. In some embodiments, the article exhibits a water entry pressure that is 1% to 10% higher than a comparative article when tested according to the Assembly WEP Test. In some embodiments, the article exhibits a water entry pressure that is 1% to 5% higher than a comparative article when tested according to the Assembly WEP Test.

In some embodiments, the article exhibits a water entry pressure that is 5% to 45% higher than a comparative article when tested according to the Assembly WEP Test. In some embodiments, the article exhibits a water entry pressure that is 10% to 40% higher than a comparative article when tested according to the Assembly WEP Test. In some embodiments, the article exhibits a water entry pressure that is 15% to 35% higher than a comparative article when tested according to the Assembly WEP Test. In some embodiments, the article exhibits a water entry pressure that is 20% to 30% higher than a comparative article when tested according to the Assembly WEP Test. In some embodiments, the article exhibits a water entry pressure that is 25% higher than a comparative article when tested according to the Assembly WEP Test.

In some embodiments, the comparative article is identical to the article except that the inner region of the first surface of the membrane of the article has a perimeter that differs from the first surface of the membrane of the comparative article. In some embodiments, the comparative article is identical to the article except that the inner region of the first surface of the membrane of the article has a perimeter that exceeds the first surface of the membrane of the comparative article.

In some embodiments, the comparative article is identical to the article except that the inner region of the first surface of the membrane of the article has a perimeter that is 1% to 75% higher than a perimeter of an inner region of the first surface of the membrane of the comparative article. In some embodiments, the comparative article is identical to the article except that the inner region of the first surface of the membrane of the article has a perimeter that is 10% to 75% higher than a perimeter of an inner region of the first surface of the membrane of the comparative article. In some embodiments, the comparative article is identical to the article except that the inner region of the first surface of the membrane of the article has a perimeter that is 15% to 75% higher than a perimeter of an inner region of the first surface of the membrane of the comparative article. In some embodiments, the comparative article is identical to the article except that the inner region of the first surface of the membrane of the article has a perimeter that is 25% to 75% higher than a perimeter of an inner region of the first surface of the membrane of the comparative article. In some embodiments, the comparative article is identical to the article except that the inner region of the first surface of the membrane of the article has a perimeter that is 35% to 75% higher than a perimeter of an inner region of the first surface of the membrane of the comparative article. In some embodiments, the comparative article is identical to the article except that the inner region of the first surface of the membrane of the article has a perimeter that is 45% to 75% higher than a perimeter of an inner region of the first surface of the membrane of the comparative article. In some embodiments, the comparative article is identical to the article except that the inner region of the first surface of the membrane of the article has a perimeter that is 55% to 75% higher than a perimeter of an inner region of the first surface of the membrane of the comparative article. In some embodiments, the comparative article is identical to the article except that the inner region of the first surface of the membrane of the article has a perimeter that is 65% to 75% higher than a perimeter of an inner region of the first surface of the membrane of the comparative article. In some embodiments, the comparative article is identical to the article except that the inner region of the first surface of the membrane of the article has a perimeter that is 70% to 75% higher than a perimeter of an inner region of the first surface of the membrane of the comparative article.

In some embodiments, the comparative article is identical to the article except that the inner region of the first surface of the membrane of the article has a perimeter that is 1% to 70% higher than a perimeter of an inner region of the first surface of the membrane of the comparative article. In some embodiments, the comparative article is identical to the article except that the inner region of the first surface of the membrane of the article has a perimeter that is 1% to 65% higher than a perimeter of an inner region of the first surface of the membrane of the comparative article. In some embodiments, the comparative article is identical to the article except that the inner region of the first surface of the membrane of the article has a perimeter that is 1% to 55% higher than a perimeter of an inner region of the first surface of the membrane of the comparative article. In some embodiments, the comparative article is identical to the article except that the inner region of the first surface of the membrane of the article has a perimeter that is 1% to 45% higher than a perimeter of an inner region of the first surface of the membrane of the comparative article. In some embodiments, the comparative article is identical to the article except that the inner region of the first surface of the membrane of the article has a perimeter that is 1% to 35% higher than a perimeter of an inner region of the first surface of the membrane of the comparative article. In some embodiments, the comparative article is identical to the article except that the inner region of the first surface of the membrane of the article has a perimeter that is 1% to 25% higher than a perimeter of an inner region of the first surface of the membrane of the comparative article. In some embodiments, the comparative article is identical to the article except that the inner region of the first surface of the membrane of the article has a perimeter that is 1% to 15% higher than a perimeter of an inner region of the first surface of the membrane of the comparative article. In some embodiments, the comparative article is identical to the article except that the inner region of the first surface of the membrane of the article has a perimeter that is 1% to 10% higher than a perimeter of an inner region of the first surface of the membrane of the comparative article.

In some embodiments, the comparative article is identical to the article except that the inner region of the first surface of the membrane of the article has a perimeter that is 10% to 70% higher than a perimeter of an inner region of the first surface of the membrane of the comparative article. In some embodiments, the comparative article is identical to the article except that the inner region of the first surface of the membrane of the article has a perimeter that is 15% to 65% higher than a perimeter of an inner region of the first surface of the membrane of the comparative article. In some embodiments, the comparative article is identical to the article except that the inner region of the first surface of the membrane of the article has a perimeter that is 25% to 55% higher than a perimeter of an inner region of the first surface of the membrane of the comparative article. In some embodiments, the comparative article is identical to the article except that the inner region of the first surface of the membrane of the article has a perimeter that is 35% to 45% higher than a perimeter of an inner region of the first surface of the membrane of the comparative article.

In some embodiments, the inner region of the first surface of the membrane of the comparative article has a perimeter of 9 mm to 205 mm. In some embodiments, the inner region of the first surface of the membrane of the comparative article has a perimeter of 10 mm to 205 mm. In some embodiments, the inner region of the first surface of the membrane of the comparative article has a perimeter of 50 mm to 205 mm. In some embodiments, the inner region of the first surface of the membrane of the comparative article has a perimeter of 100 mm to 205 mm. In some embodiments, the inner region of the first surface of the membrane of the comparative article has a perimeter of 150 mm to 205 mm. In some embodiments, the inner region of the first surface of the membrane of the comparative article has a perimeter of 200 mm to 205 mm.

In some embodiments, the inner region of the first surface of the membrane of the comparative article has a perimeter of 9 mm to 200 mm. In some embodiments, the inner region of the first surface of the membrane of the comparative article has a perimeter of 9 mm to 150 mm. In some embodiments, the inner region of the first surface of the membrane of the comparative article has a perimeter of 9 mm to 100 mm. In some embodiments, the inner region of the first surface of the membrane of the comparative article has a perimeter of 9 mm to 50 mm. In some embodiments, the inner region of the first surface of the membrane of the comparative article has a perimeter of 9 mm to 10 mm.

In some embodiments, the inner region of the first surface of the membrane of the comparative article has a perimeter of 10 mm to 200 mm. In some embodiments, the inner region of the first surface of the membrane of the comparative article has a perimeter of 50 mm to 150 mm. In some embodiments, the inner region of the first surface of the membrane of the comparative article has a perimeter of 50 mm to 100 mm.

In some embodiments, the comparative article has an area that differs from the first surface of the membrane of the comparative article. In some embodiments, the comparative article has an area that is the same as the area of the first surface of the membrane of the comparative article. In some embodiments, the comparative article has an area that is less than the area of the first surface of the membrane of the comparative article. In some embodiments, the comparative article has an area that is greater than the area of the first surface of the membrane of the comparative article.

In some embodiments, the inner region of the first surface of the membrane of the comparative article has an area of 7 $mm^2$ to 1500 $mm^2$. In some embodiments, the inner region of the first surface of the membrane of the comparative article has an area of 50 $mm^2$ to 1500 $mm^2$. In some embodiments, the inner region of the first surface of the membrane of the comparative article has an area of 100 $mm^2$ to 1500 $mm^2$. In some embodiments, the inner region of the first surface of the membrane of the comparative article has an area of 500 $mm^2$ to 1500 $mm^2$. In some embodiments, the inner region of the first surface of the membrane of the comparative article has an area of 750 $mm^2$ to 1500 $mm^2$. In some embodiments, the inner region of the first surface of the membrane of the comparative article has an area of 1000 $mm^2$ to 1500 $mm^2$. In some embodiments, the inner region of the first surface of the membrane of the comparative article has an area of 1250 $mm^2$ to 1500 $mm^2$.

In some embodiments, the inner region of the first surface of the membrane of the comparative article has an area of 7 $mm^2$ to 1250 $mm^2$. In some embodiments, the inner region of the first surface of the membrane of the comparative article has an area of 7 $mm^2$ to 1000 $mm^2$. In some embodiments, the inner region of the first surface of the membrane of the comparative article has an area of 7 $mm^2$ to 750 $mm^2$. In some embodiments, the inner region of the first surface of the membrane of the comparative article has an area of 7 $mm^2$ to 500 $mm^2$. In some embodiments, the inner region of the first surface of the membrane of the comparative article has an area of 7 $mm^2$ to 250 $mm^2$. In some embodiments, the inner region of the first surface of the membrane of the comparative article has an area of 7 $mm^2$ to 100 $mm^2$. In some embodiments, the inner region of the first surface of the membrane of the comparative article has an area of 7 $mm^2$ to 50 $mm^2$.

In some embodiments, the inner region of the first surface of the membrane of the comparative article has an area of 50 $mm^2$ to 1250 $mm^2$. In some embodiments, the inner region of the first surface of the membrane of the comparative article has an area of 100 $mm^2$ to 1000 $mm^2$. In some embodiments, the inner region of the first surface of the membrane of the article has an area of 500 $mm^2$ to 750 $mm^2$.

In some embodiments, the comparative article has an area to perimeter ratio that differs from the first surface of the membrane of the comparative article. In some embodiments, the comparative article has an area to perimeter ratio that is less than the area to perimeter ratio of the first surface of the membrane of the comparative article.

In some embodiments, the inner region of the first surface of the membrane of the comparative article has an area to perimeter ratio of 0.6:1 to 10:1. In some embodiments, the inner region of the first surface of the membrane of the comparative article has an area to perimeter ratio of 1:1 to 10:1. In some embodiments, the inner region of the first surface of the membrane of the comparative article has an area to perimeter ratio of 2:1 to 10:1. In some embodiments, the inner region of the first surface of the membrane of the comparative article has an area to perimeter ratio of 5:1 to 10:1. In some embodiments, the inner region of the first surface of the membrane of the comparative article has an area to perimeter ratio of 9:1 to 10:1.

In some embodiments, the inner region of the first surface of the membrane of the comparative article has an area to perimeter ratio of 0.6:1 to 9:1. In some embodiments, the inner region of the first surface of the membrane of the comparative article has an area to perimeter ratio of 0.6:1 to 5:1. In some embodiments, the inner region of the first surface of the membrane of the comparative article has an area to perimeter ratio of 0.6:1 to 2:1. In some embodiments, the inner region of the first surface of the membrane of the comparative article has an area to perimeter ratio of 0.6:1 to 1:1.

In some embodiments, the inner region of the first surface of the membrane of the comparative article has an area to perimeter ratio of 1:1 to 9:1. In some embodiments, the inner region of the first surface of the membrane of the comparative article has an area to perimeter ratio of 2:1 to 5:1.

In some embodiments, the inner region of the first surface of the membrane of the comparative article has a square shape.

Figure 7A:
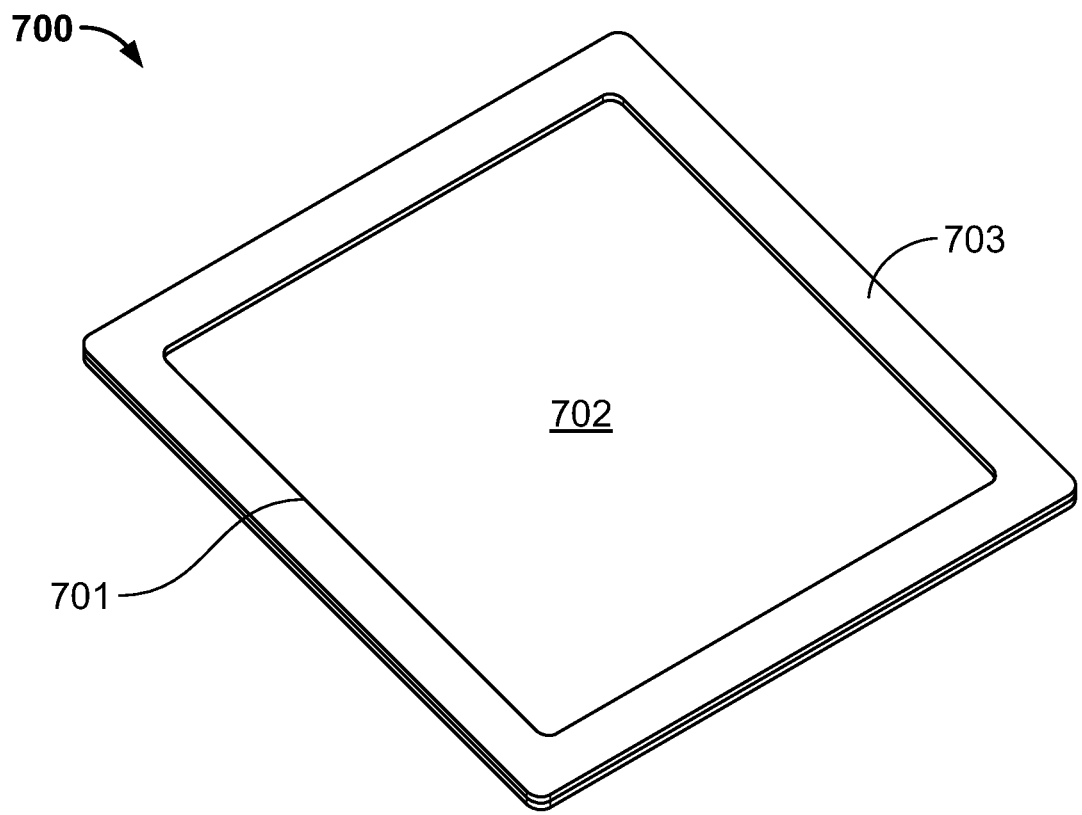
FIG. 7A is a perspective view of a first surface of a comparative article having a square shape.
Figure 7B:
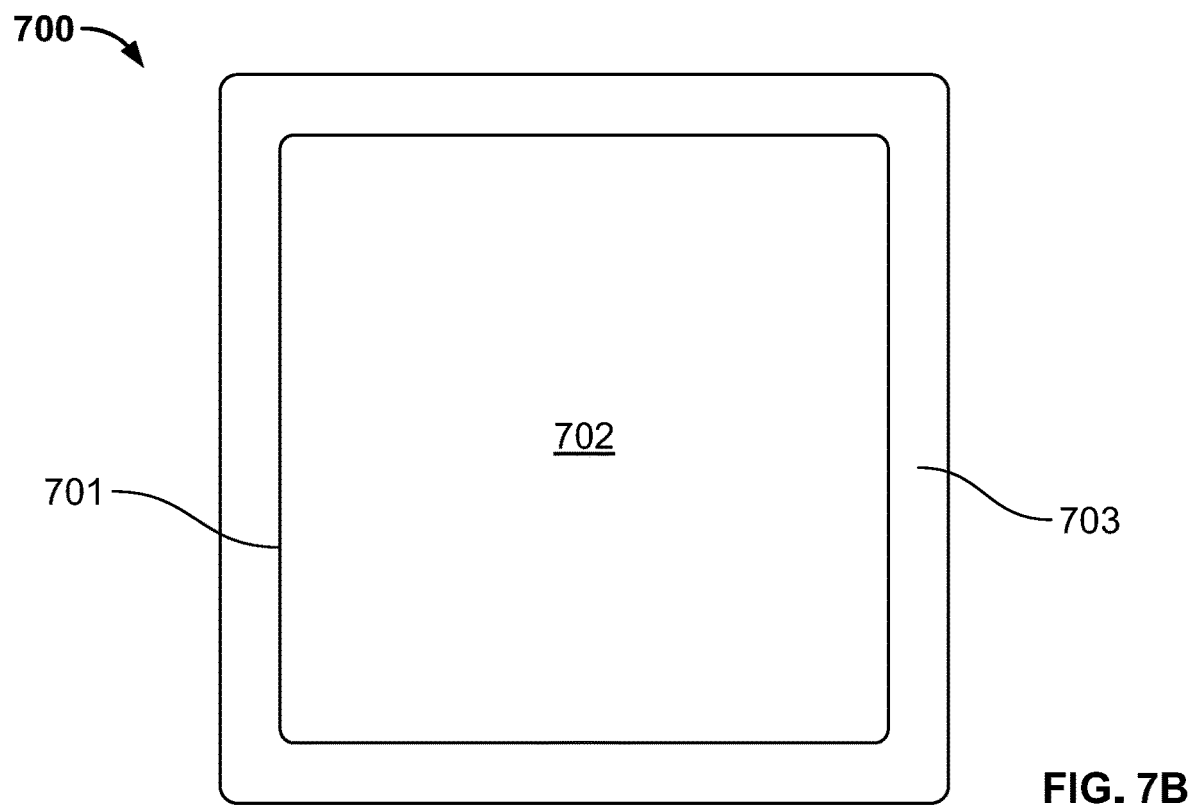
FIG. 7B is a view of a first surface of the comparative article having the square shape.
Figure 7C:
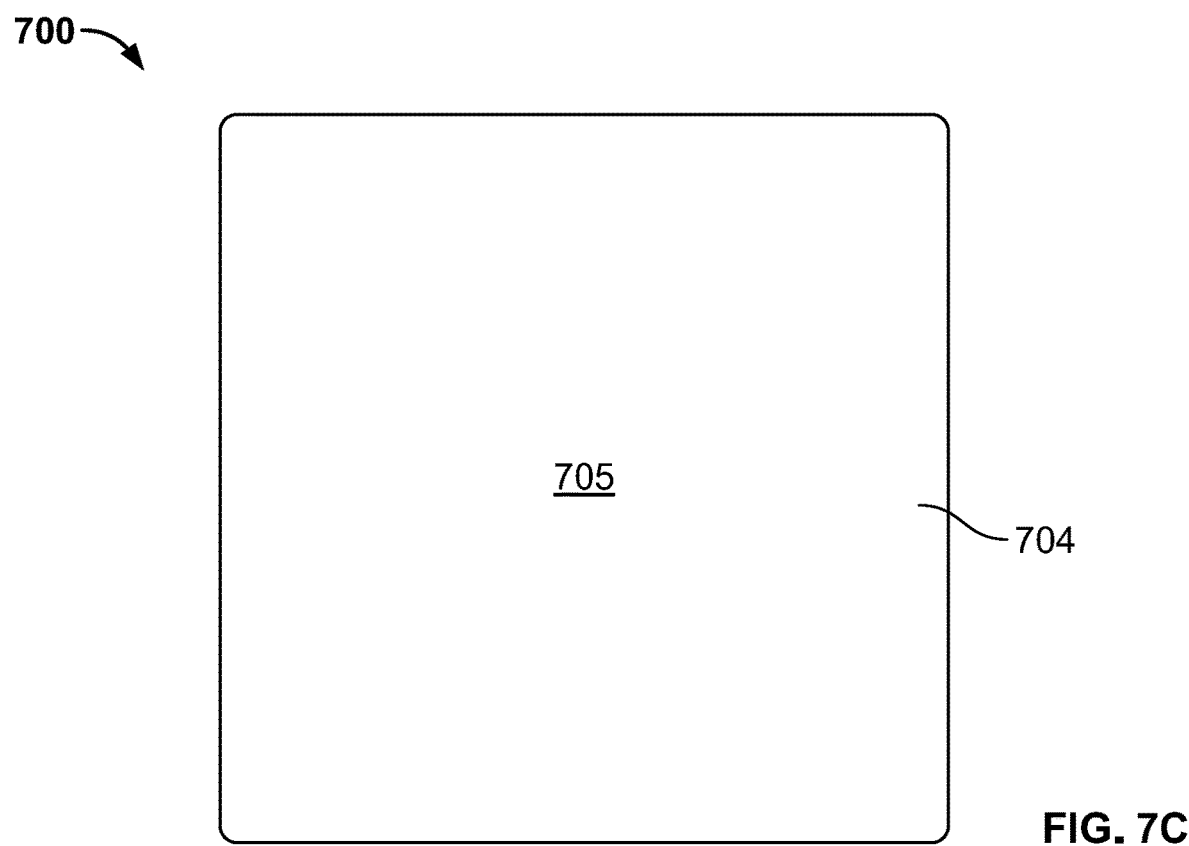
FIG. 7C is a view of the second surface of the comparative article having the square shape.
Figure 7D:
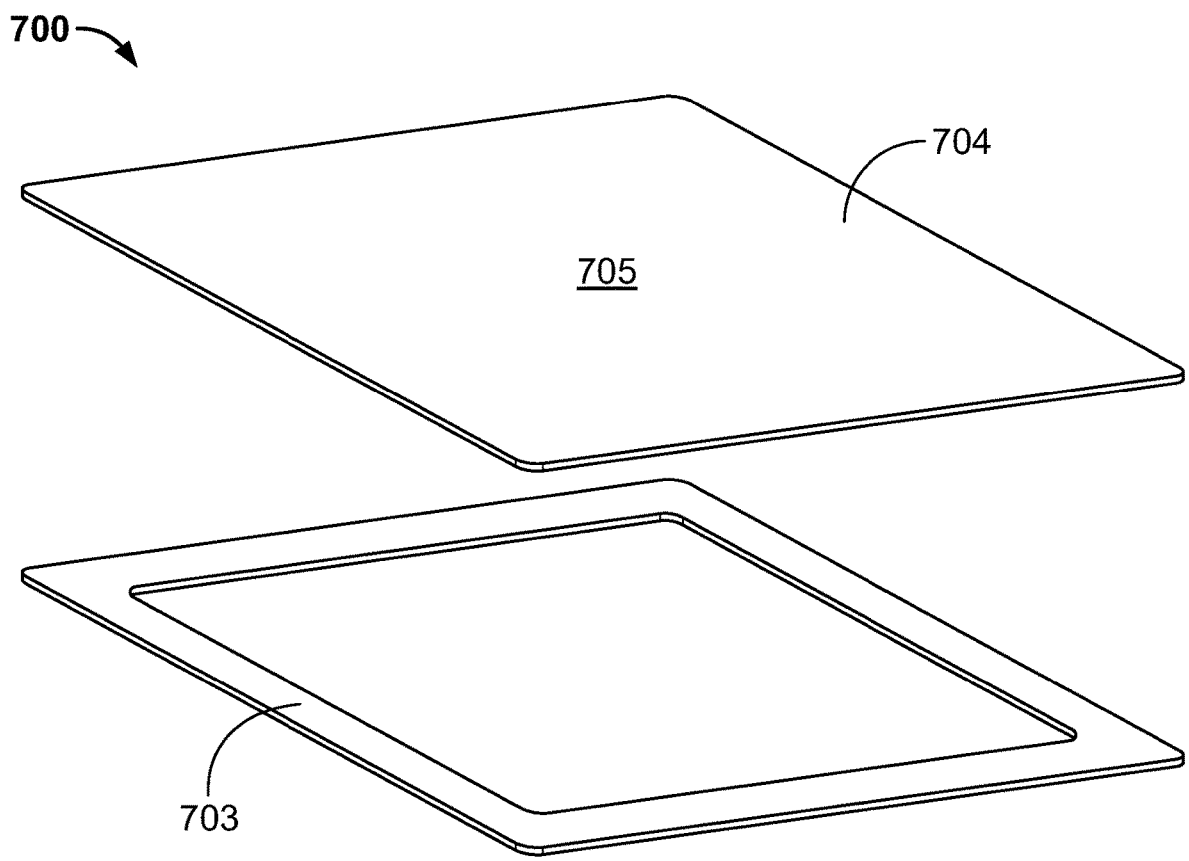
FIG. 7D is an exploded perspective view of the comparative article having the square shape.

FIG. 7A is a perspective view of a first surface of a comparative article having the square shape. FIG. 7B is a view of a first surface of the comparative article having the square shape. FIG. 7C is a view of the second surface of the comparative article having the square shape. FIG. 7D is an exploded perspective view of the comparative article having the square shape.

As shown in FIGS. 7A and 7B, comparative article 700 may include a membrane having a first surface 701 with a square shaped inner region 702. As shown in FIGS. 7A, 7B, and 7D, the first surface 701 may further include an outer region that includes adhesive layer 703. As shown in FIGS. 7C and 7D, in some embodiments, the comparative article 700 can include a second surface 704 opposite the first surface 701. In some embodiments, the second surface 704 can consist of a single region 705. As shown in FIGS. 7A-7D, the comparative article 700 may, in some embodiments, be identical to an exemplary article described herein except for inner region 702.

In some embodiments, the inner region of the first surface of the membrane of the comparative article has a rectangular shape.

Figure 8A:
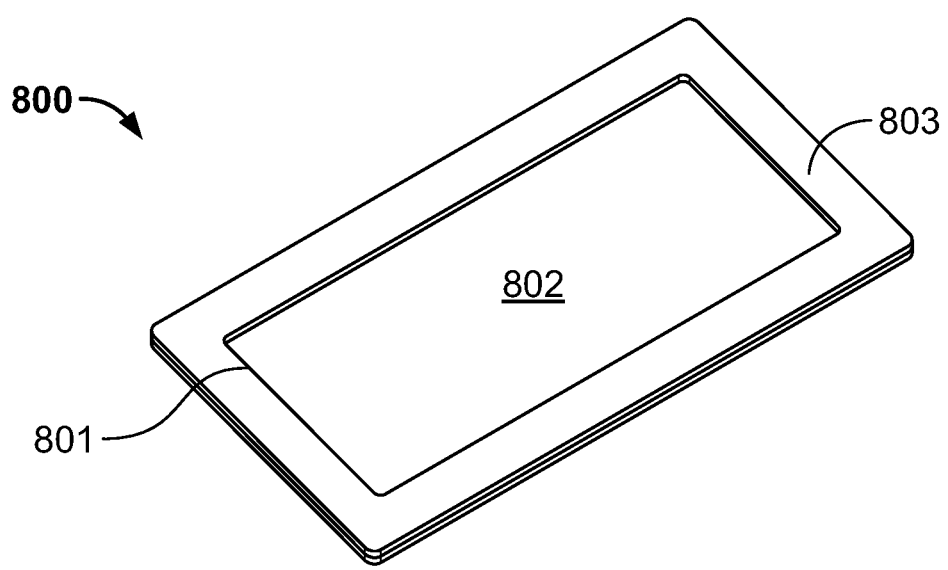
FIG. 8A is a perspective view of a first surface of a comparative article having a rectangular shape.
Figure 8B:
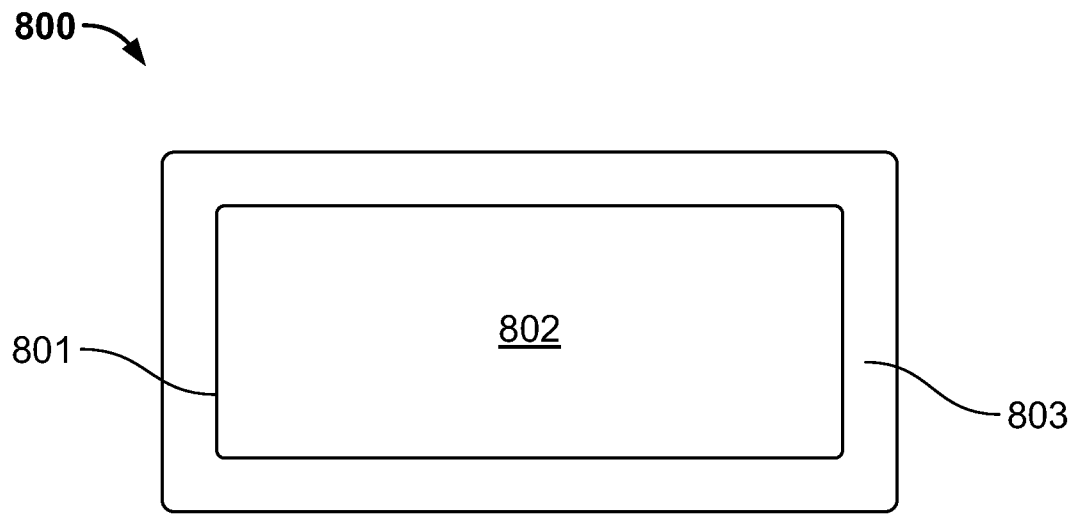
FIG. 8B is a view of a first surface of the comparative article having the rectangular shape.
Figure 8C:
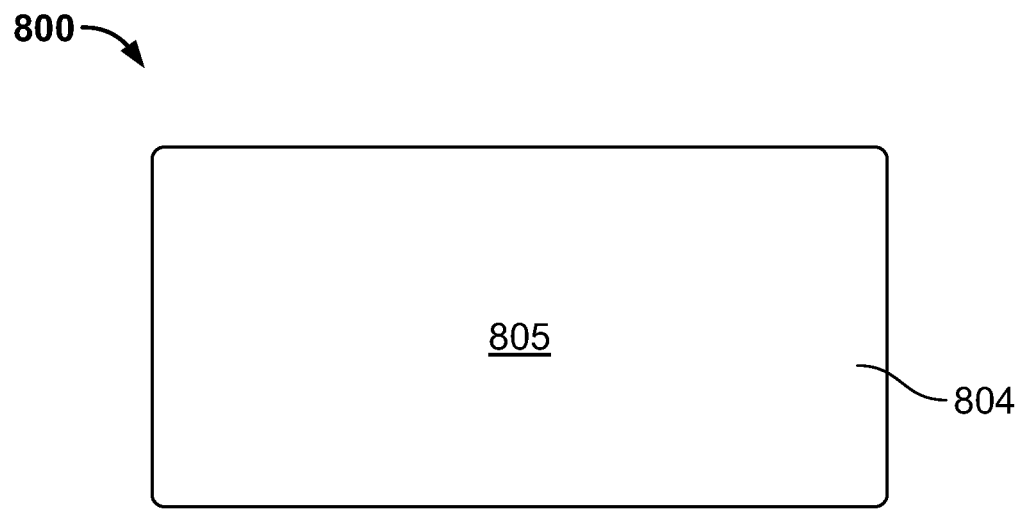
FIG. 8C is a view of the second surface of the comparative article having the rectangular shape.
Figure 8D:
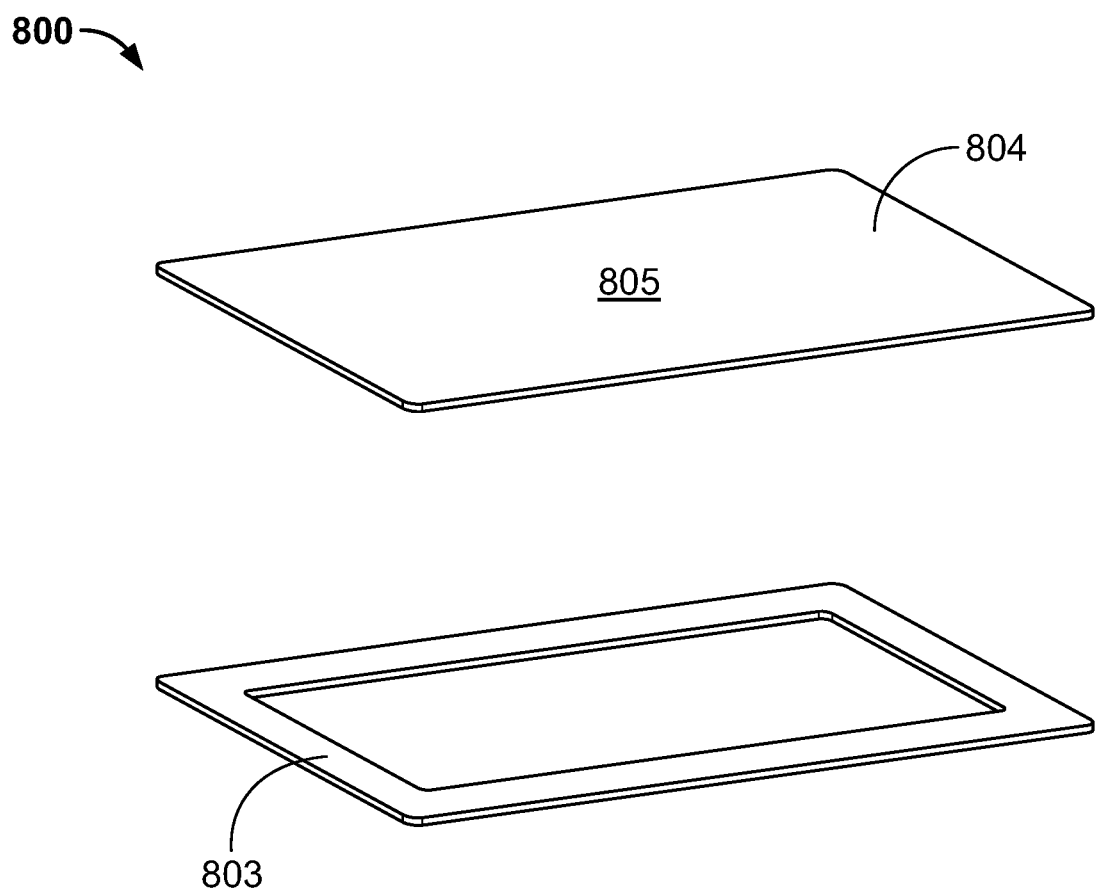
FIG. 8D is an exploded perspective view of the comparative article having the rectangular shape.

FIG. 8A is a perspective view of a first surface of a comparative article having the rectangular shape. FIG. 8B is a view of a first surface of the comparative article having the rectangular shape. FIG. 8C is a view of the second surface of the comparative article having the rectangular shape. FIG. 8D is an exploded perspective view of the comparative article having the rectangular shape.

As shown in FIGS. 8A and 8B, comparative article 800 may include a membrane having a first surface 801 with a rectangular shaped inner region 802. As shown in FIGS. 8A, 8B, and 8D, the first surface 801 may further include an outer region that includes adhesive layer 803. As shown in FIGS. 8C and 8D, in some embodiments the comparative article 800 can include a second surface 804 opposite the first surface 801. In some embodiments, the second surface 804 can consist of a single region 805. As shown in FIGS. 8A-8D, the comparative article 800 may, in some embodiments, be identical to an exemplary article described herein except for inner region 802.

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, terms such as "comprising" "including," and "having" do not limit the scope of a specific claim to the materials or steps recited by the claim.

As used herein, the term "consisting essentially of" limits the scope of a specific claim to the specified materials or steps and those that do not materially affect the basic and novel characteristic or characteristics of the specific claim.

As used herein, terms such as "consisting of" and "composed of" limit the scope of a specific claim to the materials and steps recited by the claim.

EXAMPLES

Assembly Water Entry Pressure Test ("Assembly WEP Test") Procedure: All the Examples and Comparative Examples were subjected to the Assembly WEP Test described herein. The WEP testing assembly included a clamping fixture, a test plate and a system for applying pressurized water (e.g., deionized water). The test plate and article to be tested were installed into a clamping fixture that seals the plate to the WEP test device. Water pressure was applied to the system, and was flowed through a hole in the test plate that pressurizes the vent. Water pressure was ramped to a selected pressure (e.g., 5 psi), held at that pressure for 60 seconds, and then ramped at a controlled rate of 0.05 psi/second until the article failed by way of a water leak. Failure pressure was recorded as the 'Water Entry Pressure" with the results for each example shown in Table 1 below.

Example 1: An exemplary article having a curved diamond inner region was created as described herein and shown in FIGS. 4A to 4D. The article included a porous ePTFE membrane according to U.S. Pat. No. 3,953,566 that was rendered oleophobic with a coating as described in U.S. Pat. No. 5,376,441 bonded using heat and/or pressure to a double-sided pressure sensitive silicone adhesive layer with an inside breathable area of 440 $mm^2$, with a curved-diamond edge shape. The inner region perimeter was 95.3 mm, 16.2% greater than the comparative example (square comparative). The area to perimeter ratio of the curved-diamond inner region was 4.6. The Assembly WEP Test was performed on a polypropylene test plate with two side by side identical rectangular open holes each having a total open area of 347 $mm^2$. The article was applied to the polypropylene plate with pressure (0.2 N/mm for 10 s) using a rubber compression head. The polypropylene plate with the article adhered to the surface over the holes is clamped tightly. A machine capable of administering a water pressure ramp applied water pressure. Water pressure was applied to the adhesive side of the article. Pressure was ramped to 5 psi and held for 60 seconds. After the hold, the pressure was ramped to 0.05 psi per second until failure. Failure was identified visually. Reinforcement on the edges delayed burst failure. Burst failure for this Example occurred at approximately 10.13 psi, a 29.2% improvement over the comparative square shaped article described herein, infra.

Comparative Example 1: A comparative article having a square shaped inner region shown in FIGS. 7A to 7D was created as described herein, with a porous ePTFE membrane according to U.S. Pat. No. 3,953,566 that was rendered oleophobic with a coating as described in patent U.S. Pat. No. 5,376,441 bonded using heat and/or pressure to a double-sided pressure sensitive silicone adhesive layer with an inside breathable area of 440 mm$^2$, with a square shape. The inner perimeter length was 82.0 mm. The area to perimeter ratio was 5.4. Assembly WEP was performed on a polypropylene plate with two side by side identical rectangular open holes with a total open area of 347 mm$^2$. The comparative article was applied to the polypropylene plate with pressure (0.2 N/mm for 10 s) using a rubber compression head. The polypropylene plate with the vent adhered to the surface over the holes was clamped tightly. A machine capable of administering a water pressure ramp applies water pressure. Water pressure is applied to the adhesive side of the vent. Pressure was ramped to 5 psi and held for 60 seconds. After the hold, the pressure was ramped 0.05 psi per second until failure. Failure was identified visually. Reinforcement on the edges delayed burst failure. Burst failure for this Example occurred at approximately 7.84 psi.

Example 2: An exemplary article having a four-tab-jigsaw shaped inner region shown in FIGS. 1A to 1D was created as described in Example 1. The article included a porous ePTFE membrane and an adhesive layer, but unlike Example 1, included a four-tab-jigsaw shaped inner region. The inner perimeter was 99.2 mm, 20.9% greater than the comparative example (square comparative). The area to perimeter ratio was 4.4. WEP testing was performed on a polypropylene plate with two side by side identical rectangular open holes with a total open area of 347 mm$^2$. The article was applied to the polypropylene plate with pressure (0.2 N/mm for 10 s) using a rubber compression head. Water pressure is applied to the adhesive side of the article. Pressure was ramped quickly to 5 psi and held for 60 seconds. After the hold, the pressure was ramped to 0.05 psi per second until failure. Reinforcement on the edges delayed burst failure. Burst failure for this Example occurred at approximately 10.84 psi, a 38.3% improvement over the comparative square article.

Example 3: An exemplary article having an eight-tab-jigsaw shaped inner region shown in FIGS. 2A to 2D was created as described in Example 1, with a porous ePTFE membrane and an adhesive layer. The inner perimeter was 110.1 mm, 34.3% greater than the comparative article with the square inner region. The area to perimeter ratio for this part was 4.0. WEP testing was performed on a polypropylene plate with two side by side identical rectangular open holes with a total open area of 347 mm$^2$. The adhesive vent was applied to the polypropylene plate with pressure (0.2 N/mm for 10 s) using a rubber compression head. Water pressure was applied to the adhesive side of the vent. Pressure was ramped to 5 psi and held for 60 seconds. After the hold, the pressure was ramped to 0.05 psi per second until failure. Reinforcement on the edges delayed burst failure. Burst failure for this Example occurred at approximately 10.03 psi, a 27.9% improvement over the comparative square article.

Example 4: An exemplary article having a sawtooth shaped inner region shown in FIGS. 3A to 3D was created as described as described in Example 1, with a porous ePTFE membrane and an adhesive layer. The inner perimeter was 134.7 mm, 64.3% greater than the square comparative article. The area to perimeter ratio was 3.3. WEP testing was performed on a polypropylene plate with two side by side identical rectangular open holes with a total open area of 347 mm$^2$. The article was applied to the polypropylene plate with pressure (0.2 N/mm for 10 s) using a rubber compression head. Water pressure was applied to the adhesive side of the vent. Pressure was ramped to 5 psi and held for 60 seconds. After the hold, the pressure was ramped to 0.05 psi per second until failure. Reinforcement on the edges delayed burst failure. Burst failure for this Example occurred at approximately 10.03 psi, a 27.9% improvement over the comparative square article.

Example 5: An additional exemplary article having a curved diamond inner region was created as described herein and shown in FIGS. 6A to 6D as described in Example 1, with a porous ePTFE membrane and an adhesive layer. The inner perimeter was 93.0 mm, 13.5% greater than the comparative square article. The area to perimeter ratio was 4.7. WEP testing was performed on a polypropylene plate with one open square hole with a total open area of 360 mm$^2$. The article was applied to the polypropylene plate with pressure (0.2 N/mm for 10 s) using a rubber compression head. Water pressure was applied to the adhesive side of the vent. Pressure was ramped quickly to 5 psi and held for 60 seconds. After the hold, the pressure was ramped to 0.05 psi per second until failure. Reinforcement on the edges delayed burst failure. Burst failure for this Example occurred at approximately 10.1 psi, a 28.2% improvement over the comparative square article.

TABLE 1

Results for Examples 1-5 and for Comparative Example 1 are tabulated below:

| Example | Inner Shape | Inner Area (mm$^2$) | Inner Perimeter, (mm) | Area to Perimeter Ratio | % Increase in perimeter over Comparative |
|---|---|---|---|---|---|
| 1 | Curved Diamond I | 440 | 95.3 | 4.6 | 16.2% |
| 2 | 4 Tab Jigsaw | 440 | 99.2 | 4.4 | 20.9% |
| 3 | 8 Tab Jigsaw | 440 | 110.1 | 4.0 | 34.3% |
| 4 | Sawtooth | 440 | 134.7 | 3.3 | 64.3% |
| 5 | Curved Diamond II | 440 | 93.0 | 4.7 | 13.5% |
| Comparative 1 | Square | 440 | 82.0 | 5.4 | 0% |

| Example | Inner Shape | Assembly WEP Performance (psi) | Assembly WEP Improvement over Comparative (%) |
|---|---|---|---|
| 1 | Curved Diamond I | 10.13 | 29.2% |
| 2 | 4 Tab Jigsaw | 10.84 | 38.3% |
| 3 | 8 Tab Jigsaw | 10.03 | 27.9% |
| 4 | Sawtooth | 10.03 | 27.9% |
| 5 | Curved Diamond II | 10.05 | 28.2% |
| Comparative 1 | Square | 7.84 | 0% |

Example 6: An exemplary article having an inner region with a rectangular-four-tab-jigsaw-shape shown in FIGS. 5A to 5D is created as described in Example 1, with a porous ePTFE membrane and an adhesive layer. The inner perimeter is 106.2 mm, 15.0% greater than a comparative article with a rectangular-shaped inner region. The area to perimeter ratio is 4.1. WEP testing is performed on a polypropylene plate with two side by side identical rectangular open holes with a total open area of 344 mm$^2$. The adhesive vent is applied to the polypropylene plate with pressure (0.2 N/mm for 10 s) using a rubber compression head. Water pressure is applied to the adhesive side of the vent. Pressure is ramped to 5 psi and held for 60 seconds. After the hold, the pressure ramps 0.05 psi per second until failure. Reinforcement on the edges delays burst failure. Burst failure for this Example occurs at approximately 9.4 psi, a 25.3% improvement over the comparative rectangular article.

Comparative Example 2: A second comparative article with a rectangular inner region as shown in FIGS. 8A to 8D is created as described in Comparative Example 1, with a porous ePTFE membrane according to U.S. Pat. No. 3,953,566 that is rendered oleophobic with a coating as described in patent U.S. Pat. No. 5,376,441 bonded using heat and/or pressure to a double-sided pressure sensitive silicone adhesive with an inner region of 440 mm$^2$, with a rectangular shape. The inner perimeter length is 92.5 mm. The area to perimeter ratio is 4.8. Assembly WEP is performed on a polypropylene plate with two side by side identical rectangular open holes with a total open area of 344 mm$^2$. The adhesive vent is applied to the polypropylene plate with pressure (0.2 N/mm for 10 s) using a rubber compression head. The polypropylene plate with the vent adhered to the surface over the holes is clamped tightly. A machine capable of administering a water pressure ramp applies water pressure. Water pressure is applied to the adhesive side of the vent. Pressure is ramped to 5 psi and held for 60 seconds. After the hold, the pressure ramps 0.05 psi per second until failure. Failure is identified visually. Reinforcement on the edges delays burst failure. Burst failure for this Comparative Example occurs at approximately 7.5 psi.

TABLE 2

Results for Example 6 and Comparative Example 2 are tabulated below:

| Example | Inner Shape | Inner Area (mm$^2$) | Inner Perimeter (mm) | Area to Perimeter Ratio | % increase in perimeter over Comparative |
|---|---|---|---|---|---|
| 6 | Rectangular-Four-Tab-Jigsaw | 440 | 106.2 | 4.1 | 14.9% |
| Comparative 2 | Rectangle | 440 | 92.5 | 4.8 | 0% |

| Example | Inner Shape | Assembly WEP Performance (psi) | Assembly WEP Improvement over Comparative (%) |
|---|---|---|---|
| 6 | Rectangular-Four-Tab-Jigsaw | 9.40 | 25.3% |
| Comparative 2 | Rectangle | 7.50 | 0% |

All prior patents, publications, and test methods referenced herein are incorporated by reference in their entireties. Variations, modifications and alterations to embodiments of the present disclosure described above will make themselves apparent to those skilled in the art. All such variations, modifications, alterations and the like are intended to fall within the spirit and scope of the present disclosure, limited solely by the appended claims.

While several embodiments of the present disclosure have been described, it is understood that these embodiments are illustrative only, and not restrictive, and that many modifications may become apparent to those of ordinary skill in the art. For example, all dimensions discussed herein are provided as examples only, and are intended to be illustrative and not restrictive.

Any feature or element that is positively identified in this description may also be specifically excluded as a feature or element of an embodiment of the present as defined in the claims.

The disclosure described herein may be practiced in the absence of any element or elements, limitation or limitations, which is not specifically disclosed herein. Thus, for example, in each instance herein, any of the terms "comprising," "consisting essentially of" and "consisting of" may be replaced with either of the other two terms, without altering their respective meanings as defined herein. The terms and expressions which have been employed are used as terms of description and not of limitation, and there is no intention in the use of such terms and expressions of excluding any equivalents of the features shown and described or portions thereof, but it is recognized that various modifications are possible within the scope of the disclosure.

The invention claimed is:

1. An article comprising:
   a membrane, wherein the membrane comprises a first surface, wherein the first surface of the membrane comprises an inner region and an outer region; and
   an adhesive layer, wherein the adhesive layer is disposed on the outer region of the first surface of the membrane;
   wherein the article exhibits a water entry pressure that is 25% to 50% higher than that of a comparative article when tested according to the Assembly Water Entry Pressure Test ("Assembly WEP Test");
   wherein the comparative article is identical to the article except that the inner region of the first surface of the membrane of the article has a perimeter that is 10% to 75% greater than a perimeter of an inner region of the first surface of a membrane of the comparative article.

2. The article of claim 1, wherein at least one of:
   the inner region of the first surface of the membrane of the article has an area of 7 mm$^2$ to 1500 mm$^2$, or
   wherein the inner region of the first surface of the membrane of the article has a perimeter of 10 mm to 300 mm.

3. The article of claim 1, wherein at least one of:
   the inner region of the first surface of the membrane of the comparative article has an area of 7 mm$^2$ to 1500 mm$^2$, or
   wherein the inner region of the first surface of the membrane of the comparative article has a perimeter of 9 mm to 205 mm.

4. The article of claim 1, wherein the inner region of the first surface of the membrane of the article has an area to perimeter ratio of 0.3:1 to 9:1.

5. The article of claim 1, wherein the inner region of the first surface of the membrane of the comparative article has an area to perimeter ratio of 0.6:1 to 10:1.

6. The article of claim 1, wherein the membrane is a polymer membrane.

7. The article of claim 6, wherein the polymer membrane is an expanded polytetrafluoroethylene (ePTFE) membrane.

8. The article of claim 1, wherein the membrane comprises an oleophobic coating.

9. The article of claim 1, wherein the membrane comprises a second surface opposite the first surface.

10. The article of claim 9, wherein the second surface of the membrane consists of a single region.

11. The article of claim 9, wherein the second surface of the membrane does not comprise an adhesive layer.

12. The article of claim 1, wherein the article is a vent, wherein the vent further comprises a vent housing.

13. The article of claim 12, wherein the vent is an automotive vent.

14. The article of claim 12, wherein the vent is bonded to the vent housing by the adhesive layer.

15. The article of claim 1, wherein the adhesive layer comprises at least one adhesive chosen from a silicone adhesive, an acrylic adhesive, or any combination thereof.

16. The article of claim 1, wherein the adhesive layer is present only on some portions of the outer region.

17. The article of claim 1, wherein the inner region of the first surface of the membrane of the article has a curved diamond shape, a four-tab-jigsaw shape, an eight-tab-jigsaw shape, or a sawtooth shape.

18. The article of claim 1, wherein the inner region of the first surface of the membrane of the article has a rectangular curved diamond shape, a rectangular four-tab-jigsaw shape, a rectangular eight-tab-jigsaw shape, or a rectangular sawtooth shape.

19. The article of claim 1 wherein the inner region of the first surface of the membrane of the comparative article has a square shape.

20. The article of claim 1 wherein the inner region of the first surface of the membrane of the comparative article has a rectangular shape.

* * * * *